(12) United States Patent (10) Patent No.: US 12,618,551 B2

Schauf (45) Date of Patent: May 5, 2026

(54) TOOLESS COVER RETENTION AND MOISTURE PROTECTION FOR LUMINAIRES

(71) Applicant: CREE LIGHTING USA LLC, Racine, WI (US)

(72) Inventor: Anthony Schauf, Franksville, WI (US)

(73) Assignee: CREE LIGHTING USA LLC, Racine, WI (US)

( * ) Notice: Subject to any disclaimer, the term of this patent is extended or adjusted under 35 U.S.C. 154(b) by 0 days.

(21) Appl. No.: 18/427,024

(22) Filed: Jan. 30, 2024

(65) Prior Publication Data

US 2024/0255135 A1 Aug. 1, 2024

Related U.S. Application Data

(60) Provisional application No. 63/441,926, filed on Jan. 30, 2023.

(51) Int. Cl.
*F21V 31/00* (2006.01)
*A01M 29/30* (2011.01)
(Continued)

(52) U.S. Cl.
CPC ............ *F21V 31/005* (2013.01); *F21S 8/086* (2013.01); *F21V 15/01* (2013.01); *A01M 29/30* (2013.01); *A01M 29/32* (2013.01); *A01M 29/34* (2013.01); *F16L 5/02* (2013.01); *F16L 5/025* (2013.01); *F16L 5/06* (2013.01); *F16L 5/08* (2013.01); *F16L 5/10* (2013.01); *F21S 8/08* (2013.01); *F21S 8/081* (2013.01); *F21S 8/083* (2013.01);
(Continued)

(58) Field of Classification Search
CPC ........ F21V 31/00; F21V 31/005; F21V 31/03; F21W 2131/103; F21S 8/085; F21S 8/086; F21S 8/088; F21S 8/01–088; A01M 29/30; A01M 29/32; A01M 29/34; F16L 5/02; F16L 5/10; F16L 5/025; F16L 5/06; F16L 5/08
See application file for complete search history.

(56) References Cited

U.S. PATENT DOCUMENTS 4,010,362 A * 3/1977 Fletcher .................. F21S 8/086
362/375
4,028,541 A * 6/1977 Franklin ................. F21V 15/01
362/307

(Continued)

FOREIGN PATENT DOCUMENTS

WO WO-9417327 A1 * 9/1994 .............. F21V 15/00

OTHER PUBLICATIONS

Components of a light pole, https://web.archive.org/web/20220121230054/https://www.lightmart.com/blog/components-of-a-light-pole/ (Year: 2022).*
Wayback Machine time stamp from: https://web.archive.org/web/20220401000000*/https://www.lightmart.com/blog/components-of-a-light-pole/ (Year: 2022).*

*Primary Examiner* — Colin J Cattanach
(74) *Attorney, Agent, or Firm* — J. Clinton Wimbish; Maynard Nexsen PC

(57) ABSTRACT

A luminaire assembly comprising: a housing; a moisture intrusion guard including an orifice and at least one slot; a cover coupled to the housing, the cover comprising a retention assembly including at least one protrusion passing through at least one slot of the moisture intrusion guard, the retention assembly locking the cover to the housing.

12 Claims, 29 Drawing Sheets

(51) Int. Cl.

| | |
|---|---|
| *A01M 29/32* | (2011.01) |
| *A01M 29/34* | (2011.01) |
| *F16L 5/02* | (2006.01) |
| *F16L 5/06* | (2006.01) |
| *F16L 5/08* | (2006.01) |
| *F16L 5/10* | (2006.01) |
| *F21S 8/08* | (2006.01) |
| *F21V 15/01* | (2006.01) |
| *F21V 31/03* | (2006.01) |
| *F21W 131/103* | (2006.01) |

(52) U.S. Cl.
    CPC ................ *F21S 8/085* (2013.01); *F21S 8/088*
        (2013.01); *F21V 31/00* (2013.01); *F21V 31/03*
            (2013.01); *F21W 2131/103* (2013.01)

(56) References Cited

U.S. PATENT DOCUMENTS

| | | | | |
|---|---|---|---|---|
| 4,434,456 | A | * | 2/1984 | Taylor .................... F21V 15/00 |
| | | | | 362/362 |
| 2002/0018344 | A1 | * | 2/2002 | Sears, Jr. ............... F21V 17/18 |
| | | | | 362/276 |
| 2003/0201613 | A1 | * | 10/2003 | Matczak .................. F16L 5/10 |
| | | | | 277/602 |
| 2010/0073939 | A1 | * | 3/2010 | Kauffman ................ F21V 7/09 |
| | | | | 362/362 |
| 2013/0188371 | A1 | * | 7/2013 | Ham .................. F21V 23/0442 |
| | | | | 362/373 |
| 2018/0283629 | A1 | * | 10/2018 | Fisher .................... F21S 8/086 |

\* cited by examiner

TOOLESS COVER RETENTION AND MOISTURE PROTECTION FOR LUMINAIRES

RELATED APPLICATION

This application claims the benefit of priority under 35 U.S.C. § 119(e) of U.S. Provisional Patent Application No. 63/441,926, filed Jan. 30, 2023, the contents of which are incorporated herein by reference in their entirety.

FIELD

The present invention relates to luminaires and associated components and, in particular, to covers or panels eliminating tooling requirements for installation and/or retention of the panels on the luminaires and moisture protection mechanisms therefor.

BACKGROUND

Luminaire design is wide and varied depending on application and associated lighting characteristics. For areal lighting applications, including street lights and rural lighting, the luminaires are generally mounted in elevated positions relative to the ground or intended lighting area. The luminaires can include one or more panels associated with various architectures. Luminaires often include a panel or cover providing access to the driver assembly. Current luminaire design requires bolts of screws to couple the cover to the luminaire housing. This design is cumbersome, requiring correct placement of small screws through portions of the cover to engage the housing. Additionally, this design requires tooling, such as a screwdriver, drill or other rotational tool, to lock the bolts or screws into place. Moreover, the elevated positioning of the luminaires further complicates access to the cover and correct placement and tightening of bolts and/or screws.

In addition to the problems identified above, there is no simple and/or cost effective solution for preventing, or at least reducing, moisture intrusion into luminaire housings where they interface with poles or posts.

SUMMARY

In view of these disadvantages, luminaire housings and associated covers or panels are described herein that require reduced tooling or no tooling for installation and/or removal of the covers from the luminaire housing. Additionally, using the covers or panels as described herein allows for a simplified retention design for a moisture intrusion guard. Briefly, a luminaire assembly comprises a housing, and a cover coupled to the housing, the cover comprising a retention assembly including at least one protrusion passing through an aperture in the housing and locking the cover to the housing. The protrusion can engage one or more structural members defining the aperture in the housing. In some embodiments, the protrusion establishes a friction fit or cantilevered support with the housing. Alternatively, the protrusion can rotate around the structural member between open and closed positions of the cover.

In another aspect, a luminaire comprises a housing and a cover coupled to the housing and together forming an enclosure with a mounting opening thereinto. A moisture intrusion is position in the enclosure, the moisture intrusion guard defining an orifice substantially aligned with the mounting opening and including at least one slot. A guard retention structure comprises at least one protrusion passing through the at least one slot, thereby securing the moisture intrusion guard in the enclosure and forming a seal about the mounting opening.

According to an aspect of some embodiments of the present invention, there is provided a luminaire assembly comprising: a housing; and a cover coupled to the housing, the cover comprising a retention assembly including at least one protrusion passing through an aperture in the housing and locking the cover to the housing.

In an embodiment of the invention, the retention assembly of the cover comprises a plurality of protrusions for passing through apertures in the housing.

In an embodiment of the invention, the cover is locked to the housing in the closed position.

In an embodiment of the invention, the protrusion of the retention assembly comprises a back plate engaging the housing when the cover is in an open position.

In an embodiment of the invention, the back plate is rotatable between an open and closed position of the cover.

In an embodiment of the invention, the protrusion engages a structural member defining the aperture in the housing.

In an embodiment of the invention, the protrusion establishes cantilevered support with the housing.

In an embodiment of the invention, the protrusion rotates around the structural member between open and closed positions.

In an embodiment of the invention, the protrusion comprises a stepped architecture for receiving the structural member.

In an embodiment of the invention, the cover encloses a driver assembly of the luminaire assembly.

In an embodiment of the invention, the cover couples to a bottom side of the housing.

In an embodiment of the invention, the housing comprises a recess in a top portion of the housing with fins of a heatsink along the recess.

In an embodiment of the invention, walls of the recess are commensurate in length with the fins.

In an embodiment of the invention, the fins extend beyond walls of the recess.

In an embodiment of the invention, the fins are substantially parallel with one another.

In an embodiment of the invention, the fins curve radially outward.

According to a further aspect of some embodiments of the present invention, luminaire assemblies are described herein having unique heat sink architectures for the efficient operation and cooling of light emitting diode (LED) light engines. A luminaire assembly, in some embodiments, comprises a housing including a base, and a recess along a top portion of the base. Heat sink fins extend independently from a back wall of the recess in a substantially parallel fashion. In some embodiments, the walls of the recess are commensurate in length with the fins. In such embodiments, the recess walls can hide or obscure view of the fins, resulting in a smooth profile of the luminaire assembly.

In some embodiments, a luminaire assembly comprises a base, and a recess along a top portion of the base. Heat sink fins extend independently and radially outward from a back wall of the recess. The heat sink fins, in some embodiments, extend to a perimeter of the housing. Additionally, the fins can extend beyond walls of the recess.

There is thus provided a luminaire assembly comprising: a housing comprising a base, and a recess along a top portion of the base; heat sink fins extending independently from a back wall of the recess in a substantially parallel fashion.

In an embodiment of the invention, walls of the recess are commensurate in length with the fins.

In an embodiment of the invention, a light engine of the luminaire assembly resides along a bottom portion of the base under the recess of the top portion.

According to a further aspect of some embodiments of the present invention, there is provided a luminaire assembly comprising: a housing comprising a base, and a recess along a top portion of the base; heat sink fins extending independently and radially outward from a back wall of the recess.

In an embodiment of the invention, the fins extend to a perimeter of the housing.

In an embodiment of the invention, the fins extend laterally beyond walls of the recess.

In an embodiment of the invention, a light engine of the luminaire assembly resides along a bottom portion of the base under the recess of the top portion.

In another aspect of some embodiments of the invention, a luminaire assembly includes a moisture intrusion guard which is efficiently attached to the assembly whereby the same structures are used for attaching a cover to the assembly as the moisture intrusion guard. Additionally, the moisture intrusion guard is configured with an expandable and/or adjustable orifice which is capable of accommodating light pole tenons of varying diameter without any additional adjustment to the guard.

There is thus provided a luminaire assembly comprising: a housing; a moisture intrusion guard including an orifice and at least one slot; a cover coupled to the housing, the cover comprising a retention assembly including at least one protrusion passing through an aperture in the housing and the at least one slot of the moisture intrusion guard and locking the cover to the housing.

In an embodiment of the invention, the retention assembly of the cover comprises a plurality of protrusions for passing through apertures in the housing and the at least one slot of the moisture intrusion guard.

In an embodiment of the invention, the cover is locked to the housing in the closed position.

In an embodiment of the invention, the protrusion of the retention assembly comprises a back plate engaging the housing when the cover is in an open position.

In an embodiment of the invention, the back plate is rotatable between an open and closed position of the cover.

In an embodiment of the invention, the protrusion engages a structural member defining the aperture in the housing.

In an embodiment of the invention, the protrusion establishes cantilevered support with the housing.

In an embodiment of the invention, the protrusion rotates around the structural member between open and closed positions.

In an embodiment of the invention, the protrusion comprises a stepped architecture for receiving the structural member.

In an embodiment of the invention, the orifice of the moisture intrusion guard is provided with at least one slit around the circumference of the orifice.

In an embodiment of the invention, the orifice of the moisture intrusion guard is configured to receive a tenon with a cross-section of 1.66 inches to 2.375 inches.

In an embodiment of the invention, the moisture intrusion guard is provided with at least one hole disposed on a lower portion of the moisture intrusion guard.

In an embodiment of the invention, a lower portion of the moisture intrusion guard includes at least one cutout.

In an embodiment of the invention, the moisture intrusion guard is constructed of an elastic, pliable or elastomeric material.

According to a further aspect of some embodiments of the present invention, there is provided a moisture intrusion guard, comprising: a main body having an orifice disposed therethrough, sized and shaped for insertion of a light pole tenon therethrough; at least one slot on an upper portion of the moisture intrusion guard; and, at least one hole in a lower portion of the moisture guard.

In an embodiment of the invention, the guard further comprises at least one mounting portion through which the at least one hole is disposed.

In an embodiment of the invention, the at least one mounting portion is configured to be bendable separately from the main body.

In an embodiment of the invention, the guard further comprises at least one slit disposed around a circumference of the orifice.

In an embodiment of the invention, the guard further comprises at least one cutout disposed in the lower portion.

In an embodiment of the invention, the orifice is 1.66 inches to 2.375 inches in diameter.

In an embodiment of the invention, the guard is constructed of an elastic, pliable or elastomeric material.

According to a further aspect of some embodiments of the present invention, there is provided a method of installing a moisture intrusion guard in a luminaire assembly, comprising: positioning the moisture intrusion guard within a housing of the luminaire assembly; passing at least one protrusion of a cover through an aperture of the housing and at least one slot disposed within the moisture intrusion guard; rotating the cover with respect to the housing thereby closing the assembly.

In an embodiment of the invention, the method further comprises inserting a fastener through at least one hole on a lower portion of the moisture intrusion guard and into a threaded or unthreaded hole disposed in the housing.

In an embodiment of the invention, the method further comprises forming a seal between the moisture intrusion guard and the housing.

According to a further aspect of some embodiments of the present invention, there is provided a luminaire assembly comprising: a housing; a moisture intrusion guard including an orifice and at least one slot; a cover coupled to the housing, the cover including a female portion of a hinge arrangement; and, a hinge bracket, attached to the moisture intrusion guard, having at least one protrusion and a male portion of the hinge arrangement inserted therein, wherein the female portion is placed around the male portion such that the female portion is rotatable around the male portion, effectuating hinged movement of the cover.

In an embodiment of the invention, at least one protrusion of the hinge bracket is inserted through the at least one slot on the moisture intrusion guard.

In an embodiment of the invention, the female portion is disposed between two holding rings of the hinge bracket.

In an embodiment of the invention, the assembly further comprises an exterior flange attached to the hinge bracket forming a gap therebetween and trapping the housing therein.

These and other embodiments are further described in the following detailed description.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example, are not necessarily to scale and are for purposes of illustrative discussion of embodiments of the invention. In this regard, the description taken with the drawings makes apparent to those skilled in the art how embodiments of the invention may be practiced.

In the drawings.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Luminaire assemblies are described herein requiring reduced tooling or no tooling to secure panels or covers to the luminaire housing. Additionally, luminaires described herein include a simplified retention design for a moisture intrusion guard which helps the inside of the luminaire housing dry. A luminaire comprises a housing, and a cover coupled to the housing, the cover comprising a retention assembly including at least one protrusion passing through an aperture in the housing and locking the cover to the housing. In some embodiments, the retention assembly comprises a plurality of protrusions, each protrusion passing through an aperture in the housing and locking the cover to the housing. A protrusion can pass through an aperture and engage one or more structural members defining the aperture in the housing. Such engagement can occur via a variety of architectures and/or mechanisms. A protrusion, in some embodiments, rotates around a structural member of the aperture. Rotation of the protrusion can occur in response to opening or closing of the cover or panel.

Figure 1:
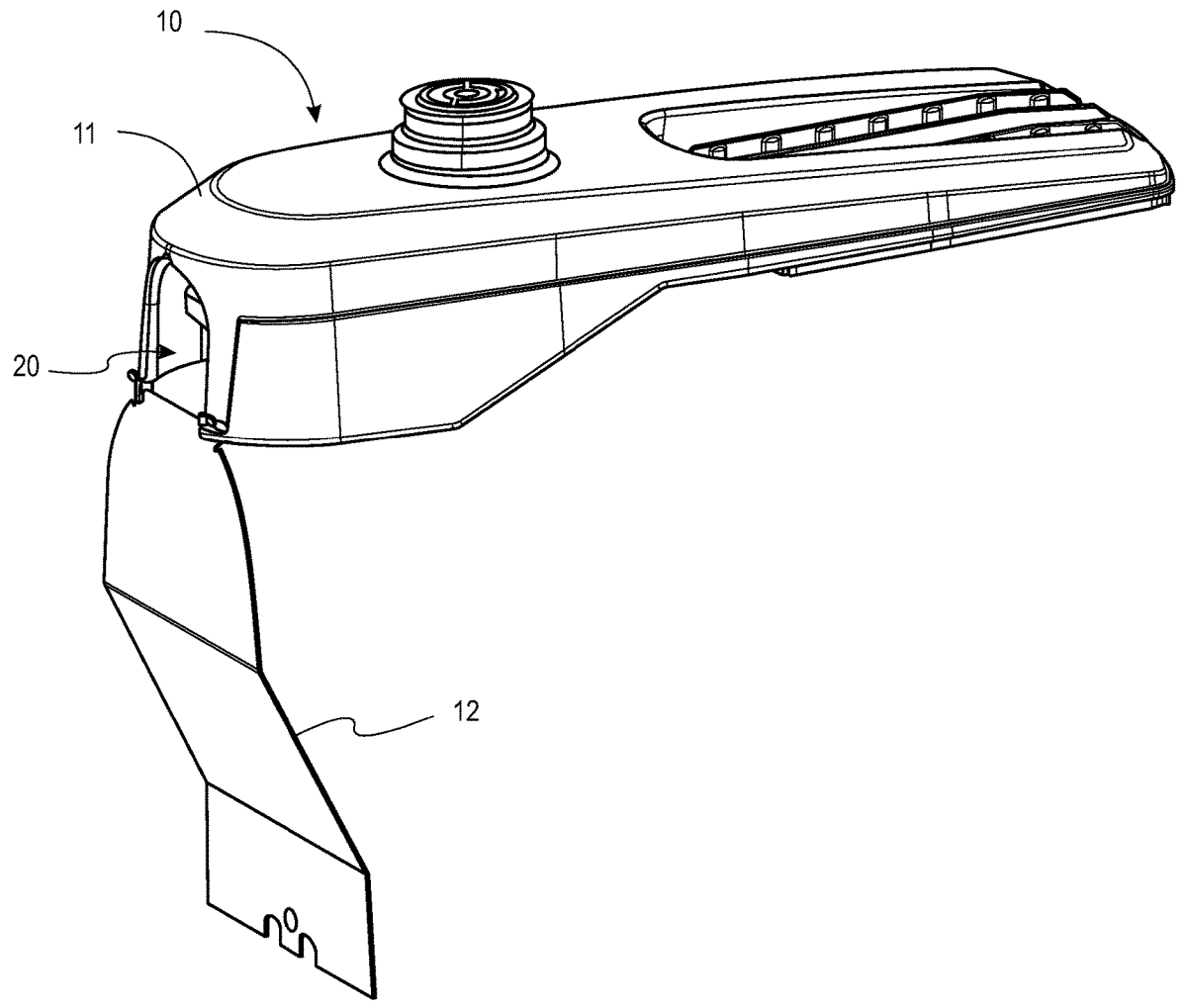
FIG. 1 is a perspective view of a luminaire assembly with a cover in the open position according to some embodiments.

FIG. 1 illustrates a side perspective view of a luminaire according to some embodiments described herein. In the embodiment of FIG. 1, the luminaire assembly 10 comprises a housing 11 and a cover 12 coupled to the housing 11. The cover 12 is in the open position.

Figure 2A:
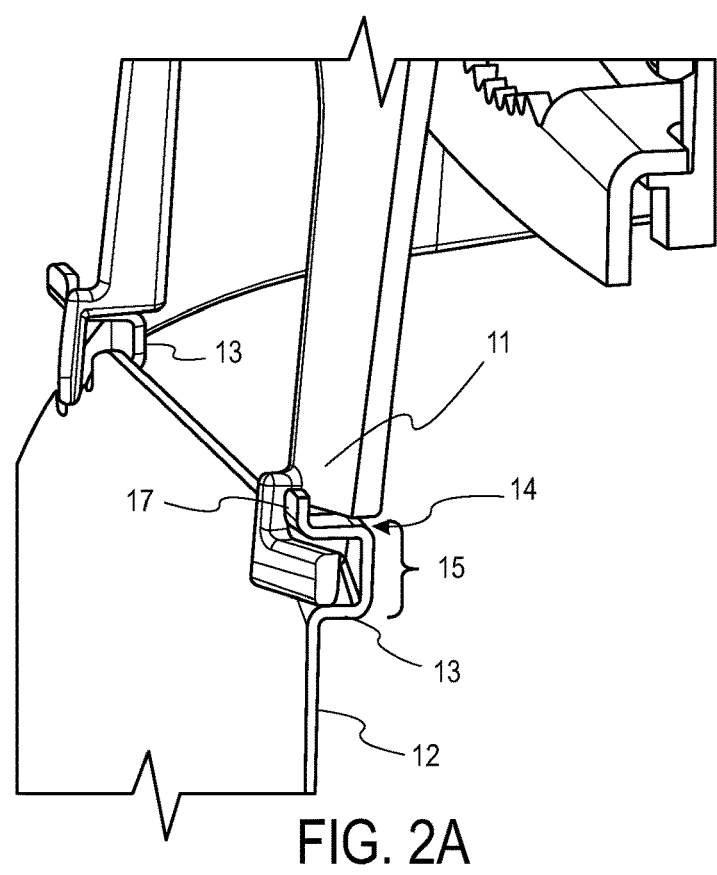
FIG. 2A is a protrusion engagement architecture of the cover with the luminaire housing according to some embodiments.

FIG. 2A is a sectional view of FIG. 1 further illustrating the coupling mechanism of the cover 12 to the luminaire housing 11. As illustrated in FIG. 2A, the cover 12 comprises two protrusions 13 for passing through apertures 14 in the base of the housing 11. Each protrusion 13 comprises a stepped architecture 15 for engaging a bar or tab 16 of the housing. The bar or tab 16 defines part of the aperture 14. In the embodiment of FIG. 2, the protrusions 13 each comprise a back plate 17. The back plate 17 contacts the housing 11, thereby retaining coupling between the cover 12 and housing 11 when the cover 12 is in the open position.

Figure 2B:
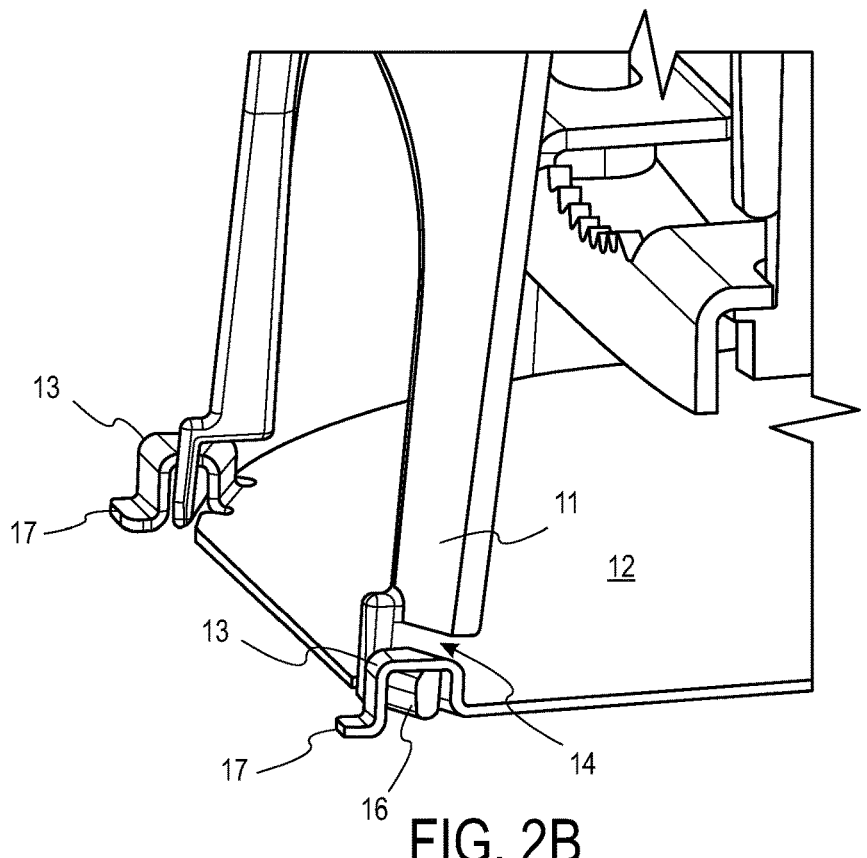
FIG. 2B is a protrusion engagement architecture of the cover with the luminaire housing according to some embodiments.

FIG. 2B is the sectional view wherein the cover 12 is in the closed position. In the closed position, each protrusion 13 has rotated approximately 90 degrees around the bar or tab 16 of the housing 11. The back plate 17 has rotated away from and is no longer in contact with the housing 11.

Figure 3:
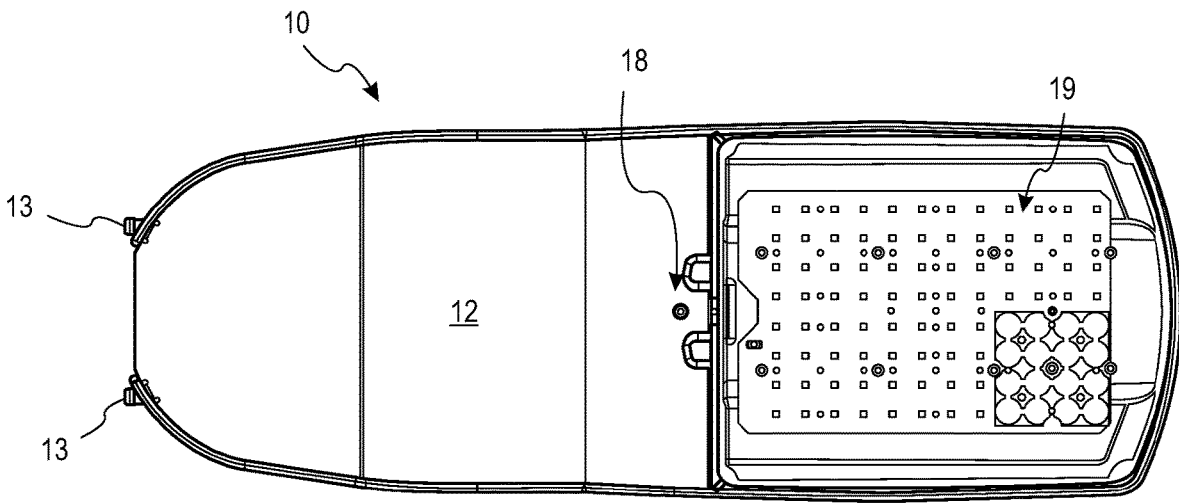
FIG. 3 is a bottom plan view of a luminaire assembly according to some embodiments.

FIG. 3 illustrates a bottom plan view of the luminaire assembly 10. The cover 12 is in the closed position. The end 18 of the cover 12 opposite the protrusions 13 can comprise one or more structural features for further engagement with the housing 11. The opposing end 18 of the cover 12 can comprise one or more protrusions (not shown) for engaging in a mechanical fit, such as a friction fit, with aperture(s) within the housing 11 interior. Such mechanical fit can assist in locking the cover 12 in the closed position. Alternatively, the cover 12 may contain one or more apertures on the opposing end 18 permitting passage of a fastening device including a clip or screw. As illustrated in FIG. 3, the cover 12 is adjacent to the light engine 19 of the luminaire assembly 10. Accordingly, the cover 12 can provide access to the LED driver assembly and/or other associated electronics of the luminaire assembly 10.

Figure 4:
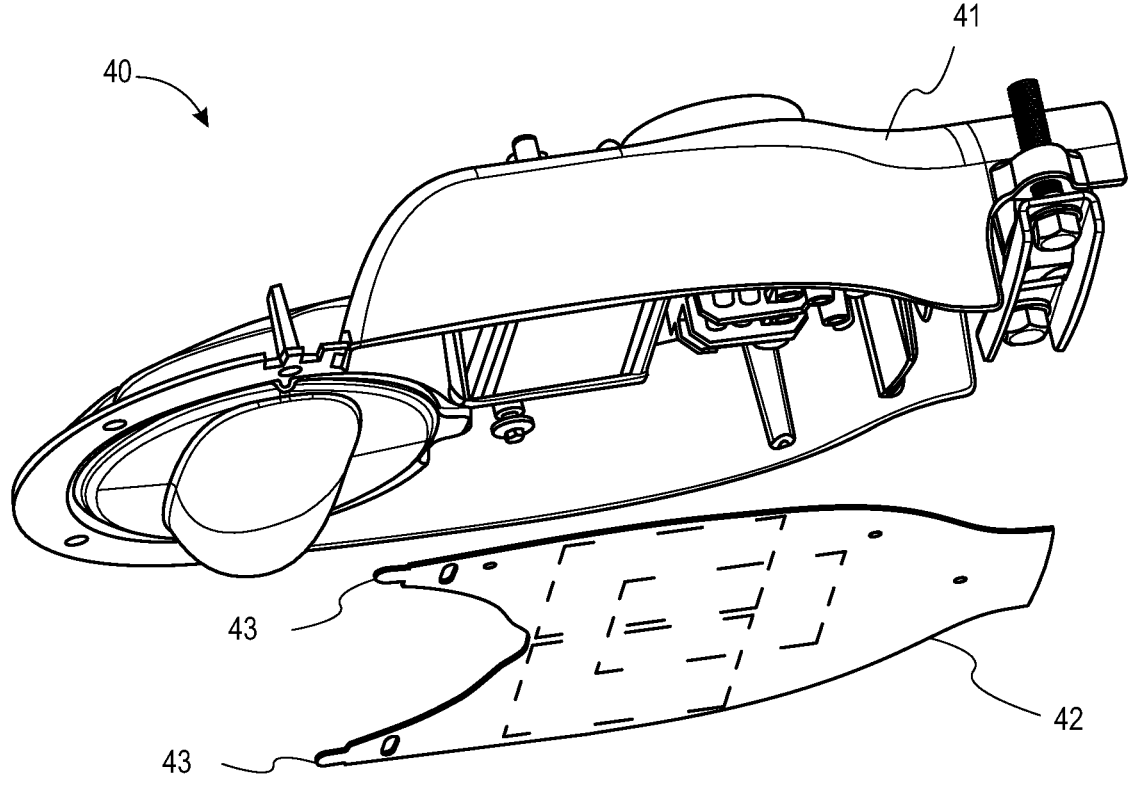
FIG. 4 is an exploded view of a luminaire assembly according to some embodiments.
Figure 5A:
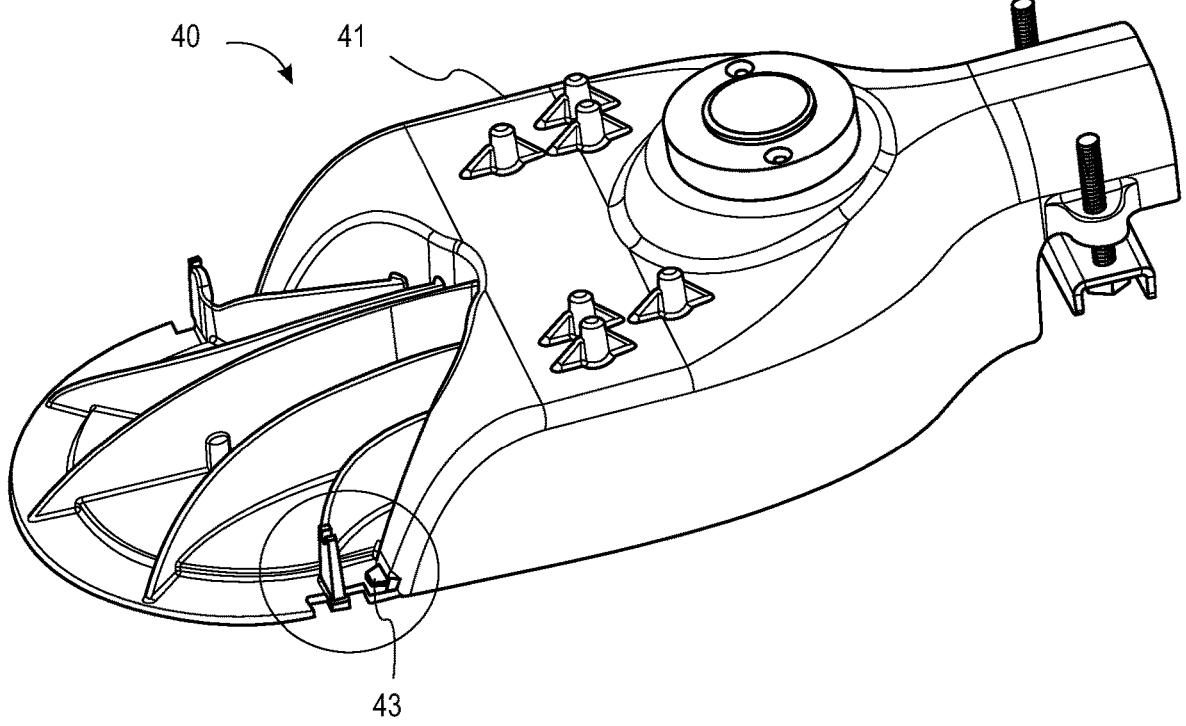
FIG. 5A-5C show a protrusion engagement architecture of the cover with the luminaire housing according to some embodiments.
Figure 5B:
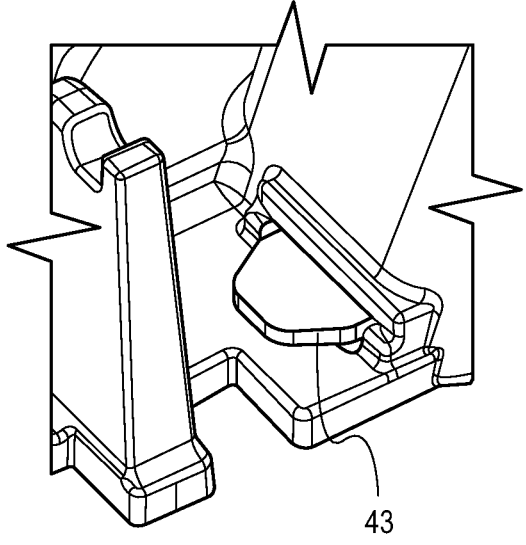
Figure 5C:
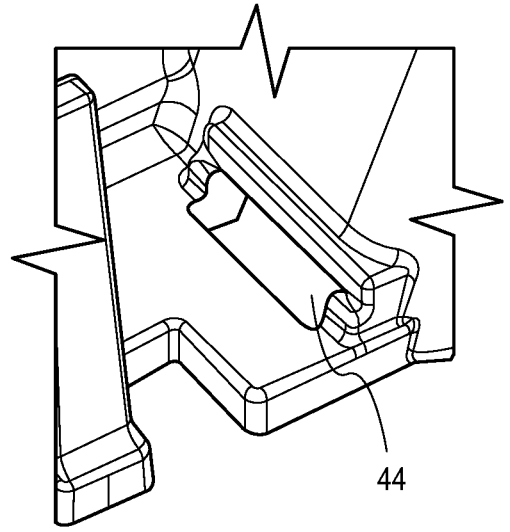
Figure 6:
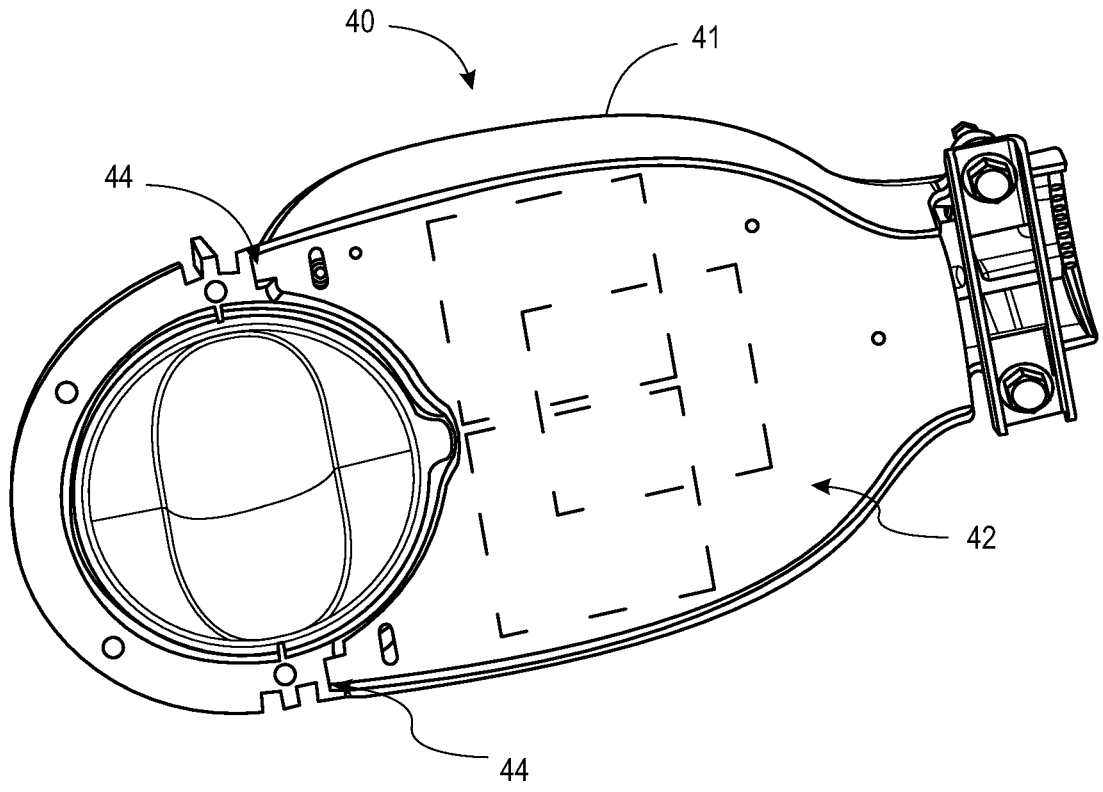
FIG. 6 is a bottom perspective view of a luminaire assembly comprising a cover in the closed position according to some embodiments.

FIGS. 4-6 illustrate another embodiment of a luminaire wherein at least one protrusion secures a cover to the luminaire housing. In the embodiment of FIG. 4, the cover 42 comprises two protrusions 43 for passing through apertures 44 in the housing 41 of the luminaire 40. FIGS. 5A-5C illustrate engagement of a protrusion 43 with the housing 41. The protrusion 43 passes through the aperture 44 in the housing 41. In some embodiments, passage of the protrusions 43 through the apertures 44 establishes a cantilevered engagement of the protrusions 43 with the housing 41, thereby securing the cover 42 to the housing 41. In some embodiments, the top surface of the protrusion 43 can comprise a bump or raised tab. The bump or raised tab is reversibly depressible as the protrusion 43 passes through the aperture. Once passage of the protrusion 43 has completed, the bump or tab reassumes a non-depressed configuration, further locking the protrusion 43 into place. The bump or raised tab can subsequently be depressed when disengaging the protrusion 43 from the aperture 44.

In some embodiments, a protrusion of the cover may pass through an aperture and engage a structure of the luminaire housing that does not form part of the aperture. With reference to FIGS. 2A and 2B, for example, the stepped structure 15 of the protrusion 13 may engage a structure beyond or outside of the aperture 14. Moreover, covers having engagement mechanisms described herein can be associated with any desired surface of the luminaire housing, including top, bottom, and sides, including front and back.

Figure 7:
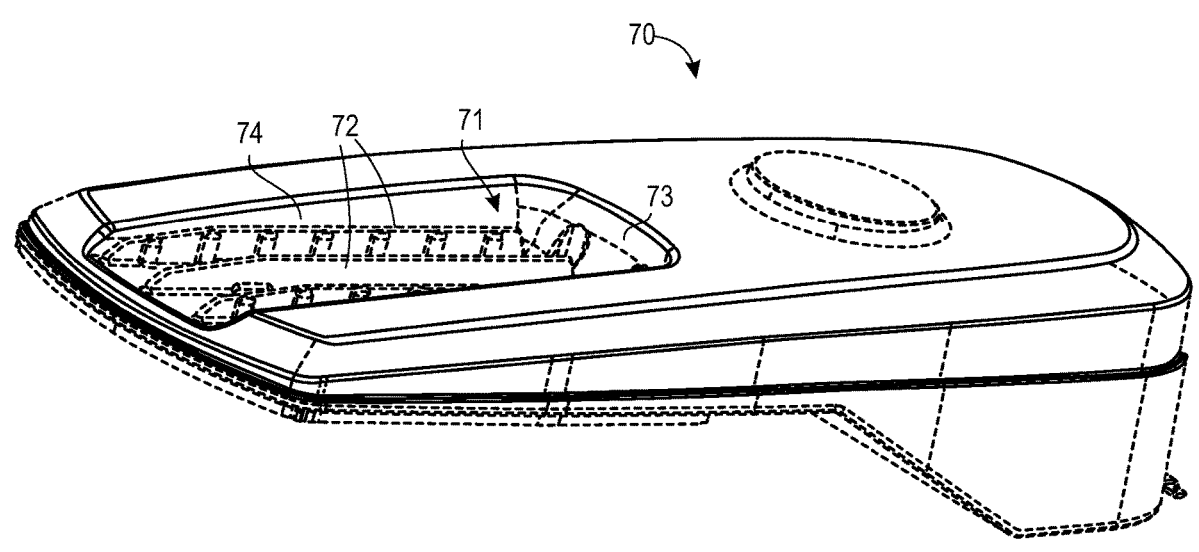
FIG. 7 is a perspective view of a luminaire assembly according to some embodiments.
Figure 8:
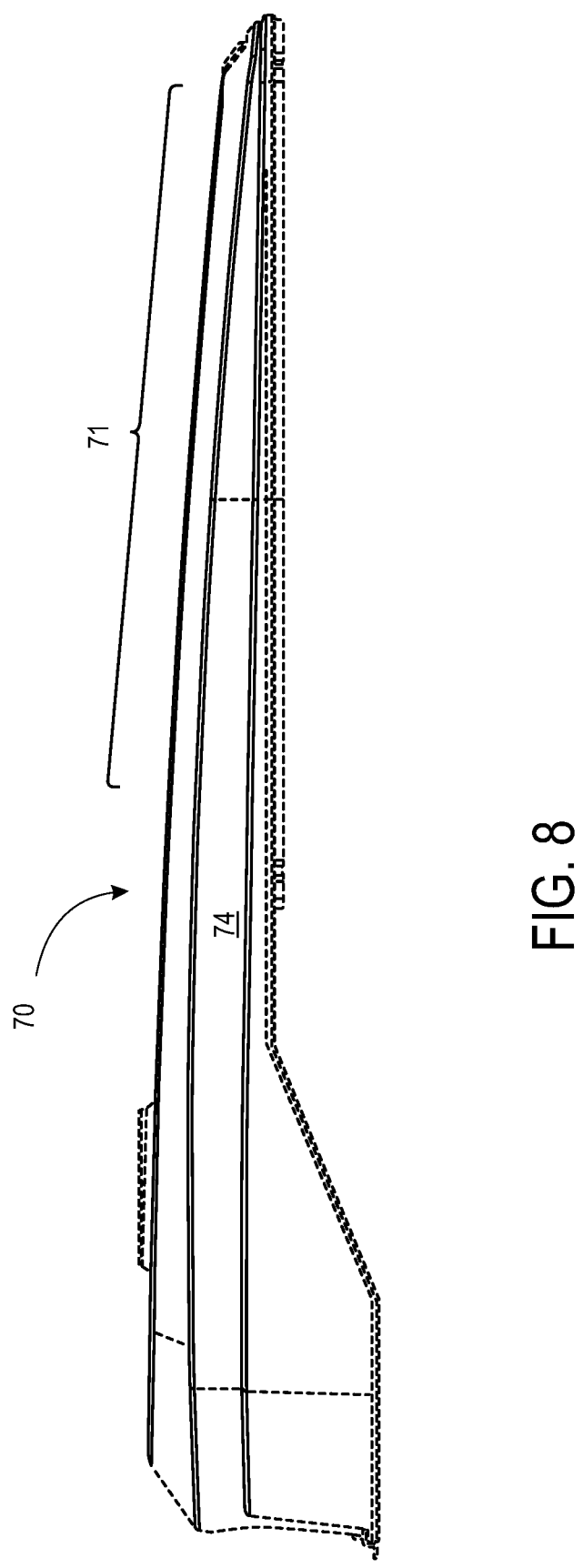
FIG. 8 is a side elevation view of the luminaire assembly of FIG. 7.

In another aspect, luminaires are described herein having unique heat sink architectures for the efficient operation and cooling of light emitting diode (LED) light engines. A luminaire, in some embodiments, comprises a housing including a base, and a recess along a top portion of the base. Heat sink fins extend independently from a back wall of the recess in a substantially parallel fashion. In some embodiments, the walls of the recess are commensurate in length with the fins. In such embodiments, the recess walls can hide or obscure view of the fins, resulting in a smooth profile of the luminaire. FIG. 7 illustrates a perspective view of a luminaire according to some embodiments. As illustrated in FIG. 7, the luminaire 70 comprises a recess 71, and heat sink fins 72 independently extending from a back wall 73 of the recess 71 in a parallel or substantially parallel manner. In the embodiment of FIG. 7, the heat sink fins 72 are commensurate in length with the side walls 74 of the recess 71. In some embodiments, the recess walls 74 can hide or obscure view of the fins 72, resulting in a smooth profile of the luminaire, as illustrated in the side elevational view of FIG. 8.

In some embodiments, a light engine of the luminaire resides along a bottom portion of the base under the recess of the top portion. In this way, heat generated by the light engine can be efficiently dissipated by the heat sink fins. In some embodiments, sidewalls of the luminaire and bottom surface or floor of the recess can have interconnected apertures. The interconnected apertures can permit cooler air to enter through the luminaire side walls and exit at the floor of the recess to cool the heat sink fins. In some embodiments, cooler air can be directed through apertures in the side walls of the recess.

Figure 9:
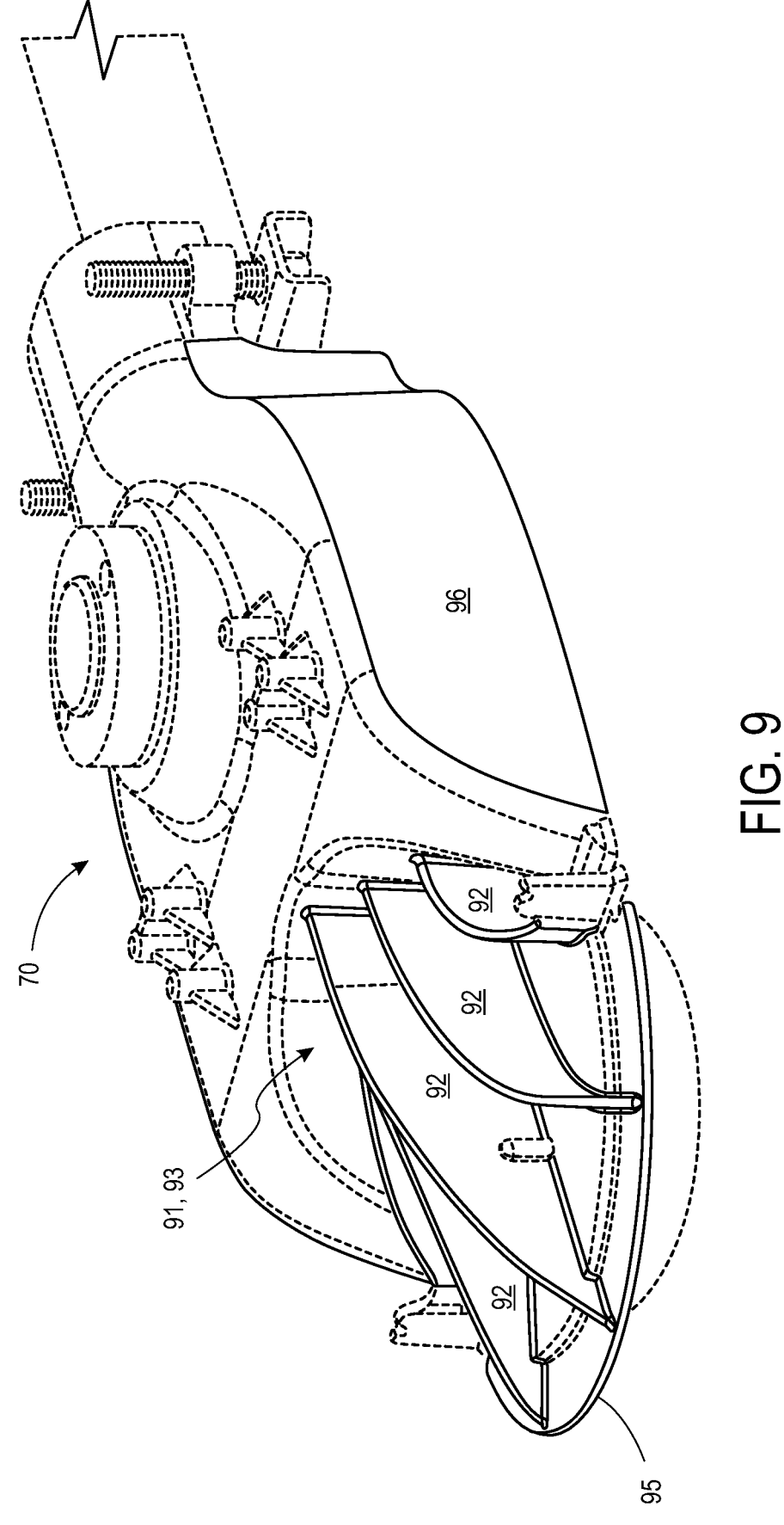
FIG. 9 is perspective view of a luminaire assembly according to some embodiments.
Figure 10:
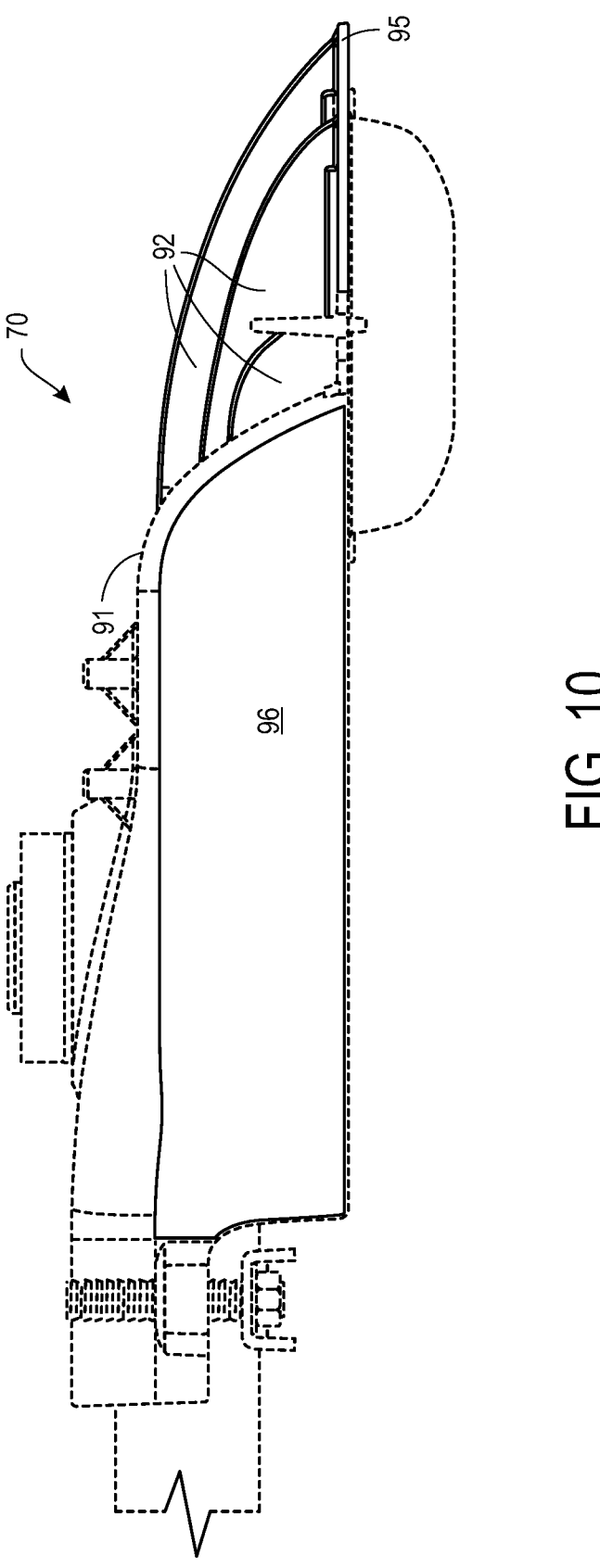
FIG. 10 is a side elevation view of the luminaire assembly of FIG. 9.

In another aspect, a luminaire comprises a base, and a recess along a top portion of the base. Heat sink fins extend independently and radially outward from a back wall of the recess. The heat sink fins, in some embodiments, extend to a perimeter of the housing. Additionally, the fins can extend beyond walls of the recess. FIG. 9 illustrates a perspective view of a luminaire according to some embodiments. As illustrated in FIG. 9, the luminaire 90 comprises a recess 91, and heat sink fins 92 independently extending from a back wall 93 of the recess 91. The heat sink fins 92 extend radially outward from the recess 91. In the embodiment of FIG. 9, the fins 92 extend radially outward to the perimeter 95 of the luminaire housing 96. The luminaire housing can have a curved perimeter 95, as illustrated in FIG. 9. In contrast to FIGS. 7-8, the fins 92 extend beyond the walls 96 of the recess 91 and are visible to an observer, as illustrated in FIG. 10. In some embodiments, a light engine of the luminaire resides along a bottom portion of the base under the recess of the top portion. In this way, heat generated by the light engine can be efficiently dissipated by the heat sink fins.

Luminaires having the heat sink fins described herein can also employ any of the cover arrangements described herein. The cover and associated coupling architecture described herein can be applied to the luminaires to cover driver assemblies and/or other electronics.

Figure 11A:
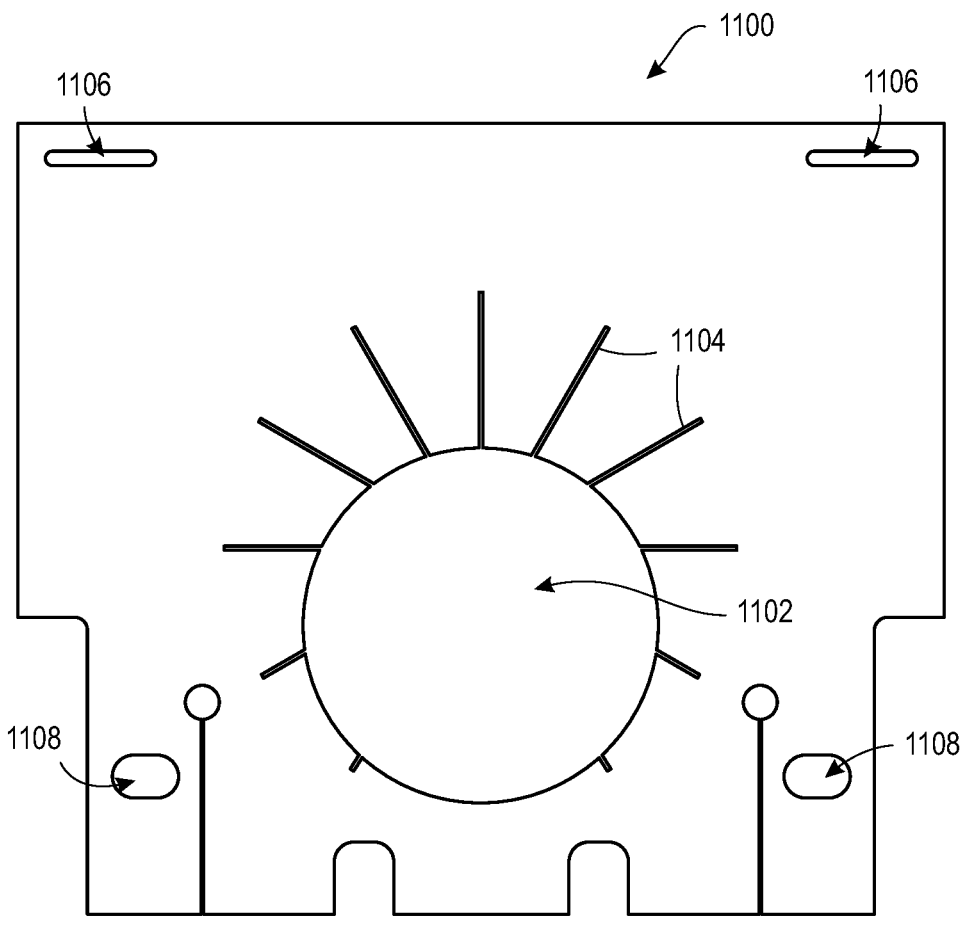
FIG. 11A is a front view of a moisture intrusion guard according to some embodiments.

As described above, current luminaire designs suffer from moisture intrusion into the luminaire housing and/or require expensive and/or complicated solutions for providing a watertight characteristic to the housing, especially where the light pole tenon enters into the housing. FIG. 11A illustrates a front view of a moisture intrusion guard 1100, according to some embodiments, configured to be attached in a simple and/or cost effective manner to the luminaire housing 11 in order to enhance protection against moisture intrusion into the housing 11 while also being adapted to accommodate varying sizes (e.g. diameter) of light pole tenon without requiring additional structure and/or labor to insert the tenon therethrough. In some embodiments of the invention, the moisture intrusion guard 1100 is constructed of an elastic, pliable or elastomeric material, such as rubber, synthetic rubber, and/or a polymeric material.

In some embodiments of the invention, an orifice 1102 is disposed within a main body the guard 1100 to permit the passage of a light pole tenon therethrough. As most tenons in the lighting industry are cylindrical in shape, the orifice 1102 is shown being substantially circular in shape. However, it should be understood that the aperture could exhibit any shape and/or size. In some embodiments, the orifice 1102 accommodates the insertion of a 1.66" tenon therethrough. The guard 1100 is also optionally provided with at least one slit 1104 around the circumference of the orifice 1102 to enable insertion of tenons that are larger in cross-section than the orifice to be passed therethrough. In some embodiments, the at least one slit 1104 enlarges the cross-section of the tenon which can be inserted through the orifice 1102 to 2.375". It should be understood that the at least one slit 1104 creates two or more "petals" which open sufficiently for the tenon to pass through but which still abut the outer surface of the tenon to create a substantial barrier for moisture intrusion prevention. This is in contrast with prior art, stamped-metal splash guards which required installers to manually deform the metal to enlarge the opening. In some embodiments, the length of the at least one slit 1104 can be varied to alter the possible range of tenon cross-section size insertable through the orifice 1102.

An upper portion of the guard 1100 is provided with at least one slot 1106 through which a protrusion 13 of the cover 12 is insertable to assist with securing the guard 1100 to the luminaire 10 when the luminaire 10 is fully assembled (in embodiments including the guard 1100). It should be understood, and as will be described more fully below with respect to at least FIGS. 12A, 12B and 16, there are efficiencies achieved by using the protrusion 13 to not only attach the cover 12 to the housing 11, but also to assist with the attachment of the guard 1100 to the whole luminaire assembly.

Figure 11B:
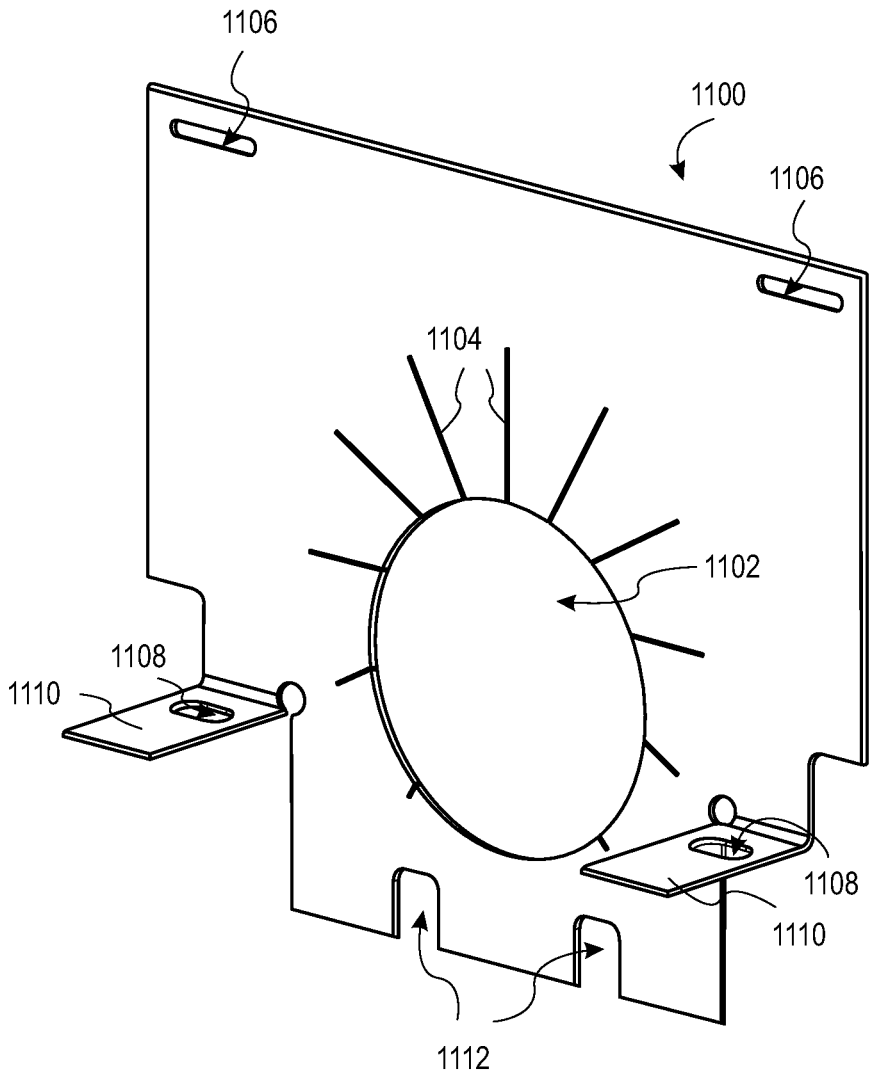
FIG. 11B is a front perspective view of the moisture intrusion guard of FIG. 11A according to some embodiments.

FIG. 11B illustrates a front perspective view of the moisture intrusion guard 1100 of FIG. 11A according to some embodiments of the invention. In an embodiment of the invention, the guard 1100 includes at least one bottom mounting portion 1110 (two are shown, each on an opposing side of the guard 1100) for attaching a lower portion of the guard 1100 to the housing 11, as will be described in more detail with respect to FIGS. 12B and 14. The at least one mounting portion 1110 has at least one hole 1108 disposed therein, configured for receipt therethrough of a fastener, such as a screw, which secures the lower portion of the guard 1100 to the housing 11. In some embodiments of the invention, the bottom mounting portion 1110 is bendable to an angle, such as the approximate 90° angle shown in FIG. 11B, separately from the main body to effectuate alignment of the at least one hole 1108 with a corresponding threaded or unthreaded hole located on the housing 11 for insertion of the fastener therein; the threaded or unthreaded hole is shown and described in more detail with respect to FIG. 14. In some embodiments of the invention, the lower portion of the guard 1100 is adapted to fit as a counterpart to features which exist in the housing 11, for example by having at least one cutout 1112 wherein housing features 11 lie when the guard 1100 is properly installed into the luminaire assembly. In some embodiments of the invention, the counterpart nature of the at least one cutout 1112 and the housing features inserted therein assist with maintaining the orientation and/or position of the guard 1100.

Figure 12A:
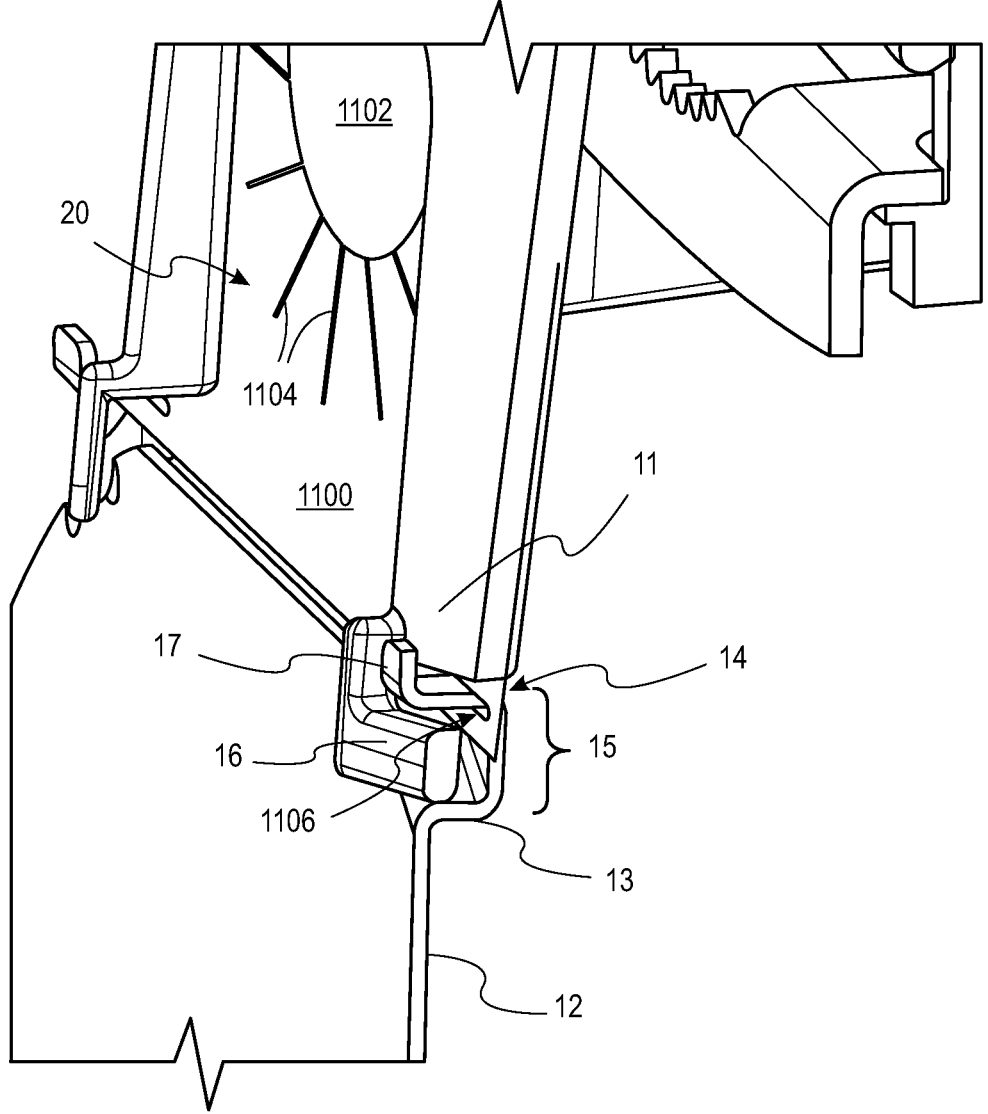
FIGS. 12A-12B show attachment of the cover and moisture intrusion guard to the luminaire housing according to some embodiments.
Figure 12B:
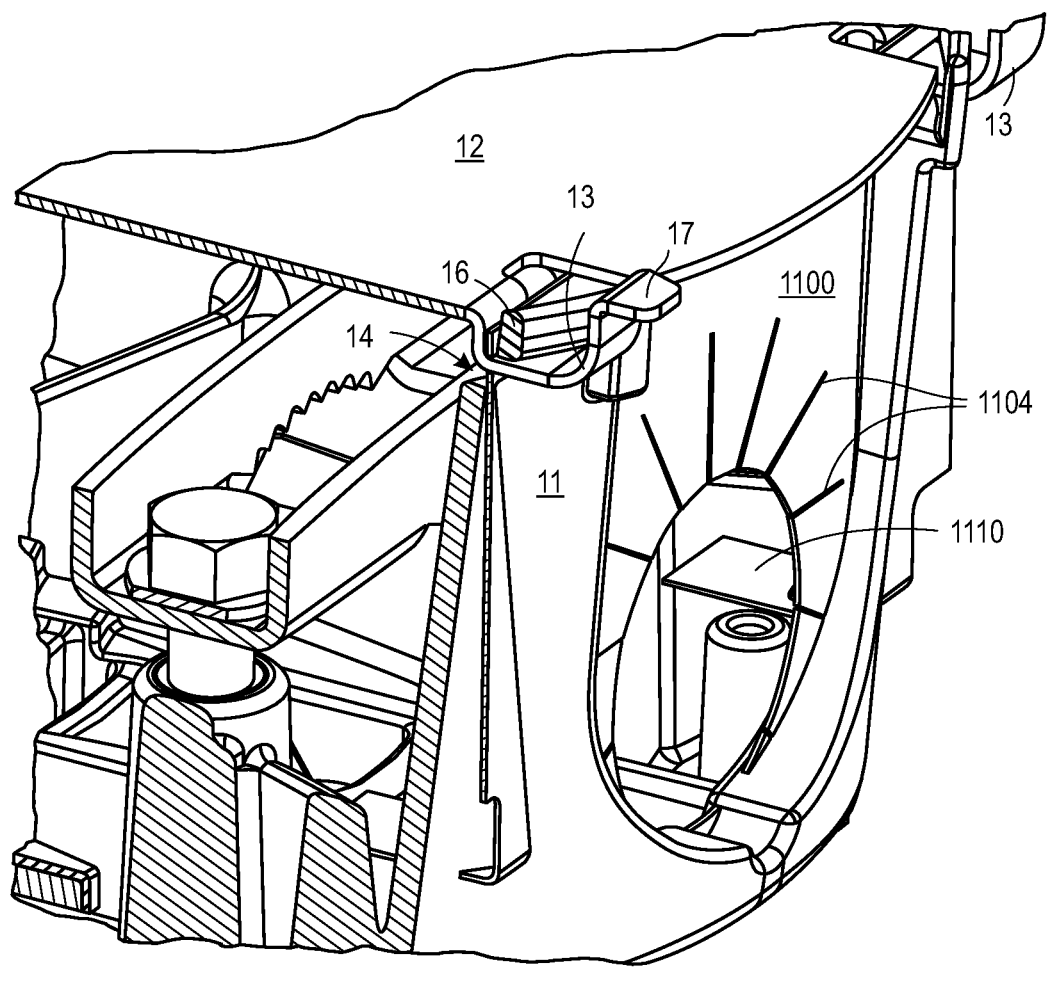
Figure 13:
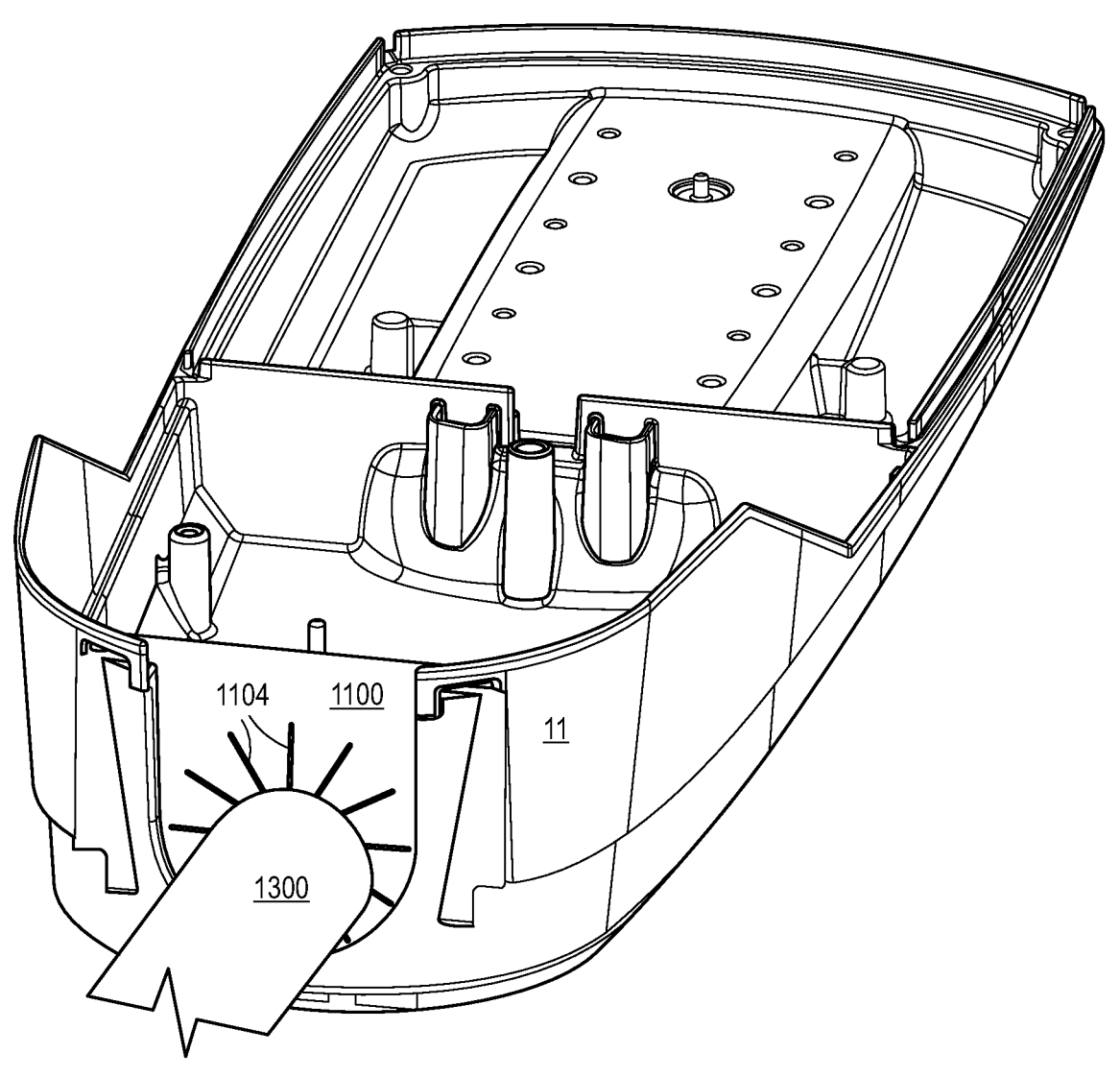
FIG. 13 is a perspective view of the luminaire housing with the moisture intrusion guard attached according to some embodiments.
Figure 15:
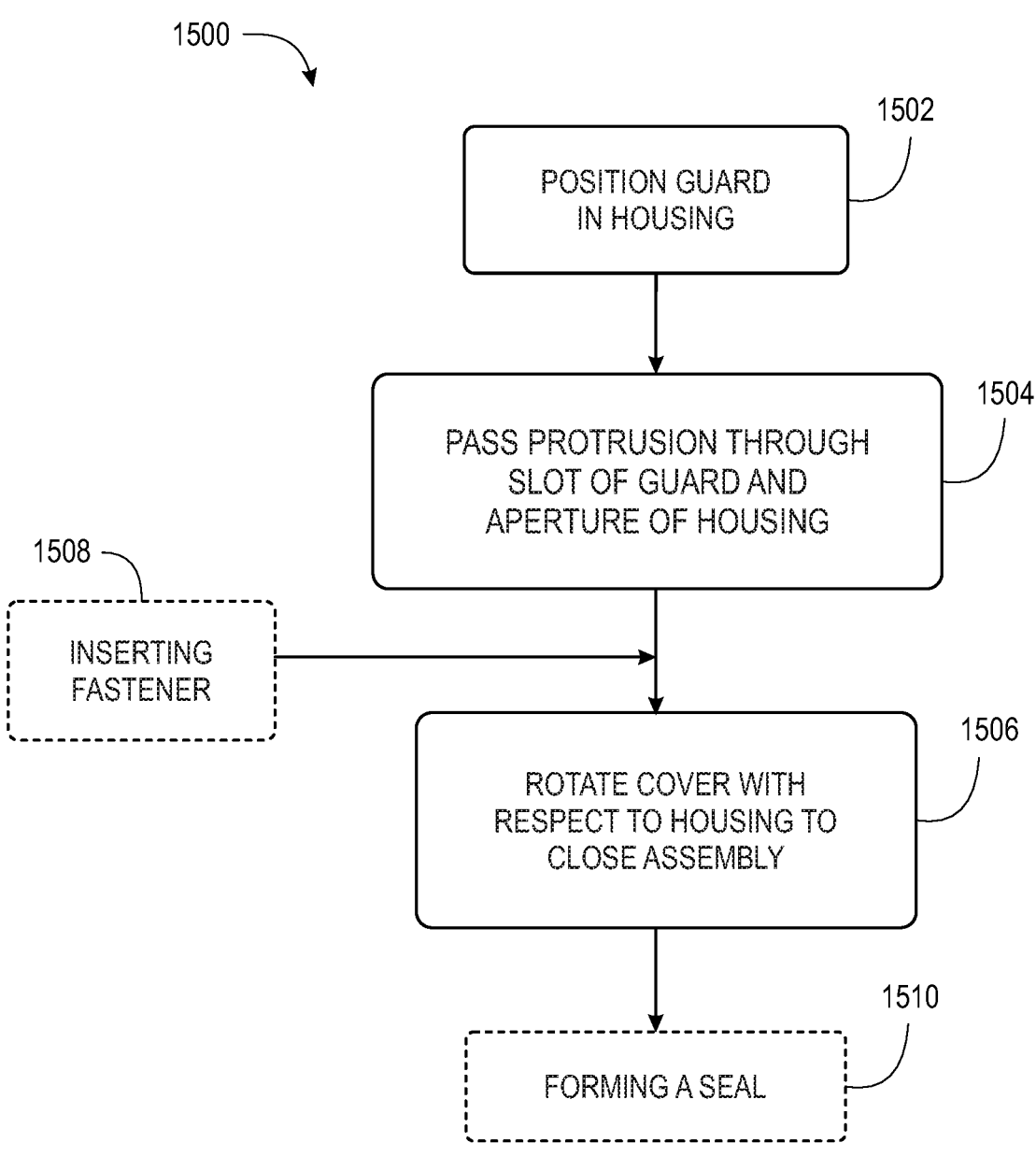
FIG. 15 is a flowchart of a method of installing a moisture intrusion guard into a luminaire housing according to some embodiments.

FIGS. 12A-12B illustrate attachment of the cover 12 and moisture intrusion guard 1100 to the luminaire housing 11 according to some embodiments. While one guard 1100 is shown in this embodiment of the luminaire assembly, a plurality of guards could be used, not necessarily all with the same configuration shown in FIGS. 11A-11B. In the interests of brevity, the flowchart 1500 of a method of installing a moisture intrusion guard into a luminaire housing shown in FIG. 15 is described herewith. FIG. 12A. FIG. 12A is a sectional view the luminaire assembly further illustrating the coupling mechanism of the cover 12 to the luminaire housing 11, including the guard 1100. In an embodiment of the invention, the guard 1100 is positioned (1502) in the housing 11 where the orifice 1102 is substantially aligned with a tenon opening 20 (shown in FIGS. 1 and 12A) such that a tenon, shown and described in more detail with respect to FIG. 13, is insertable through the tenon opening 20 and the orifice 1102 to attach the luminaire assembly 10 to the tenon 1300. In an embodiment of the invention, positioning (1502) includes positioning prominent features of the housing 11 within the cutouts 1112 and/or aligning the at least one slot 1106 with an aperture 14 and/or flexing the mounting portions 1110 to an angle (whereby the guard 1100 would be in a configuration substantially similar to that shown in FIG. 11B) and aligning the at least one hole 1108 with a threaded or unthreaded counterpart hole on the housing 11.

As illustrated in FIG. 12A, the cover 12 comprises two protrusions 13 for passing (1504) through apertures 14 in the base of the housing 11, while also passing (1504) through the at least one slot 1106 of the guard 1100, to simultaneously attach the cover 12 and the guard 1100 to the housing 11, using a single structural element of the cover 12 (the protrusions 13). Each protrusion 13 comprises a stepped architecture 15 for engaging a bar or tab 16 of the housing. The bar or tab 16 defines part of the aperture 14. In the embodiment of FIG. 12A, the protrusions 13 each comprise a back plate 17. The back plate 17 contacts the housing 11, thereby retaining coupling between the cover 12 and housing 11 when the cover 12 is in the open position, the open position shown in FIG. 12A.

FIG. 12B is the sectional view wherein the cover 12 is in the closed position. In the closed position, each protrusion 13 has rotated (1506) approximately 90 degrees around the bar or tab 16 of the housing 11, while still being inserted through the at least one slit 1104 and the apertures 14. The back plate 17 has rotated away from and is no longer in contact with the housing 11.

In some embodiments of the invention, the guard 1100 is further attached to the housing 11 by inserting and securing (1508) a fastener through the at least one hole 1108 and into the threaded or unthreaded hole 1400 of the housing 1108.

In some embodiments of the invention, a seal is formed (1510) between the guard 1100 and the housing 11 using a sealant.

In some embodiments, a protrusion of the cover may pass (1504) through an aperture 14 and/or at least one slot 1106 and engage a structure of the luminaire housing that does not form part of the aperture. With reference to FIGS. 12A and 12B, for example, the stepped structure 15 of the protrusion 13 may engage a structure beyond or outside of the aperture 14 and/or at least one slot 1106. Moreover, covers having engagement mechanisms described herein can be associated with any desired surface of the luminaire housing, including top, bottom, and sides, including front and back.

FIG. 13 illustrates a perspective view of the luminaire housing 11 with the moisture intrusion guard 1100 attached, according to some embodiments, along with a tenon 1300 inserted therethrough. It is conceived that the guard 1100, with its pliable and/or slitted 1104 configuration, forms a substantial seal against moisture intrusion into the luminaire assembly 10 where the tenon 1300 penetrates the housing 11.

Figure 14:
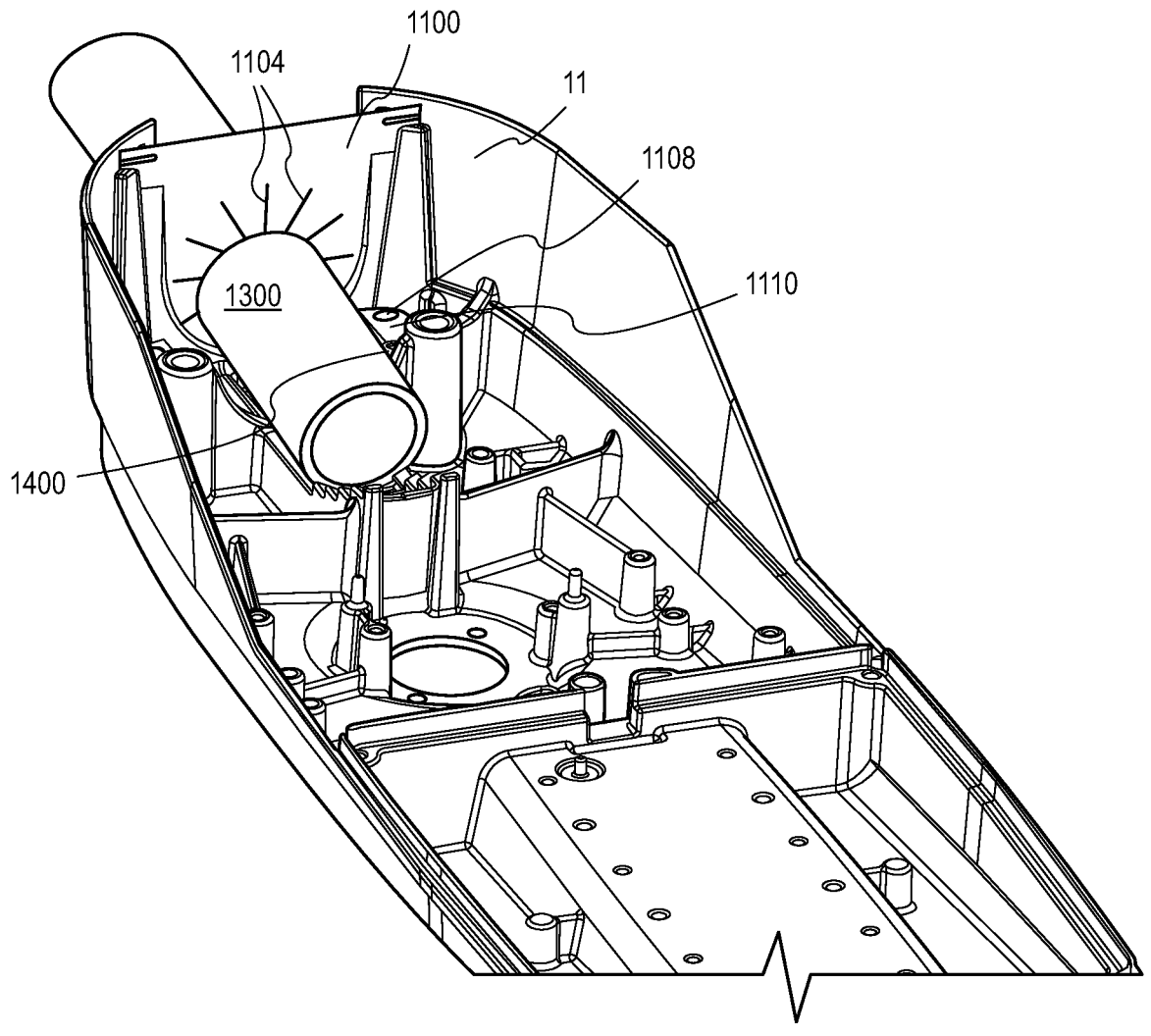
FIG. 14 is a perspective view opposite the view of FIG. 14 of the luminaire housing with the moisture intrusion guard attached according to some embodiments.

FIG. 14 illustrates a perspective view opposite the view of FIG. 13 of the luminaire housing 11 with the moisture intrusion guard 1100 attached, according to some embodiments. Shown in FIG. 14 is the interior side of the guard 1100 with the tenon 1300 inserted therethrough. Additionally, the threaded or unthreaded hole 1400 is shown in close proximity to the at least one hole 1108 of the bottom mounting portion 1110, such that a fastener could be inserted through the hole 1108 and into the threaded or unthreaded hole 1400 to attach the guard 1100 to the housing 11.

Figure 16:
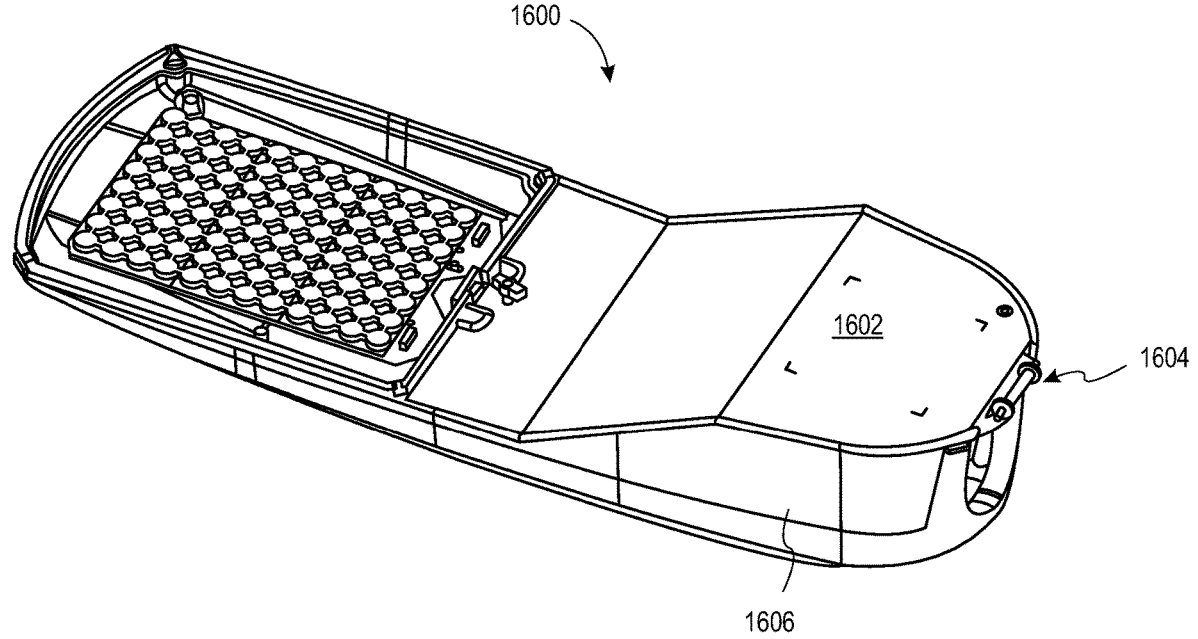
FIG. 16 is a bottom perspective view of an alternative luminaire assembly with a hinged cover, in a closed configuration, according to some embodiments.

FIG. 16 is a bottom perspective view of an alternative luminaire assembly 1600 with a hinged cover 1602, in a lockable, closed configuration, according to some embodiments. In an embodiment of the invention, the luminaire assembly 1600 is substantially similar to luminaire assembly 10, however the cover 1602 is rotatably attached to the luminaire housing 1606 by a hinge arrangement 1604. It should be understood that possible functions and configurations described with respect to luminaire assembly 10 are equally applicable to luminaire assembly 1600, except with respect to the hinged cover structure and operation of luminaire assembly 1600.

Figure 17:
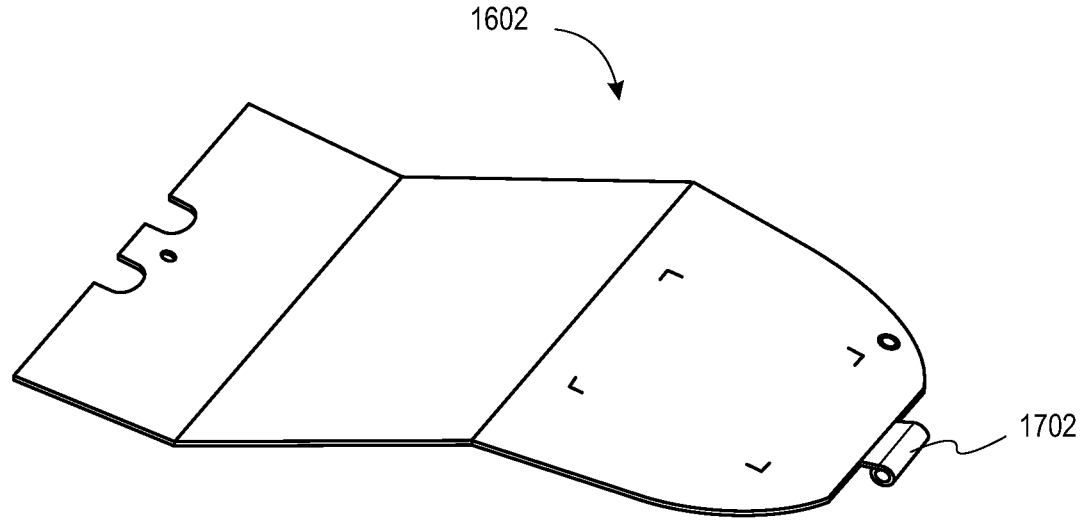
FIG. 17 is a perspective view of the hinged cover according to some embodiments.

FIG. 17 is a perspective view of the hinged cover 1602 showing the female portion 1702 of the hinge, according to some embodiments. It should be noted that the female portion 1702 of the hinge acts as the counterpart to the male portion 2002 of the hinge, shown and described in more detail with respect to FIG. 20.

Figure 18:
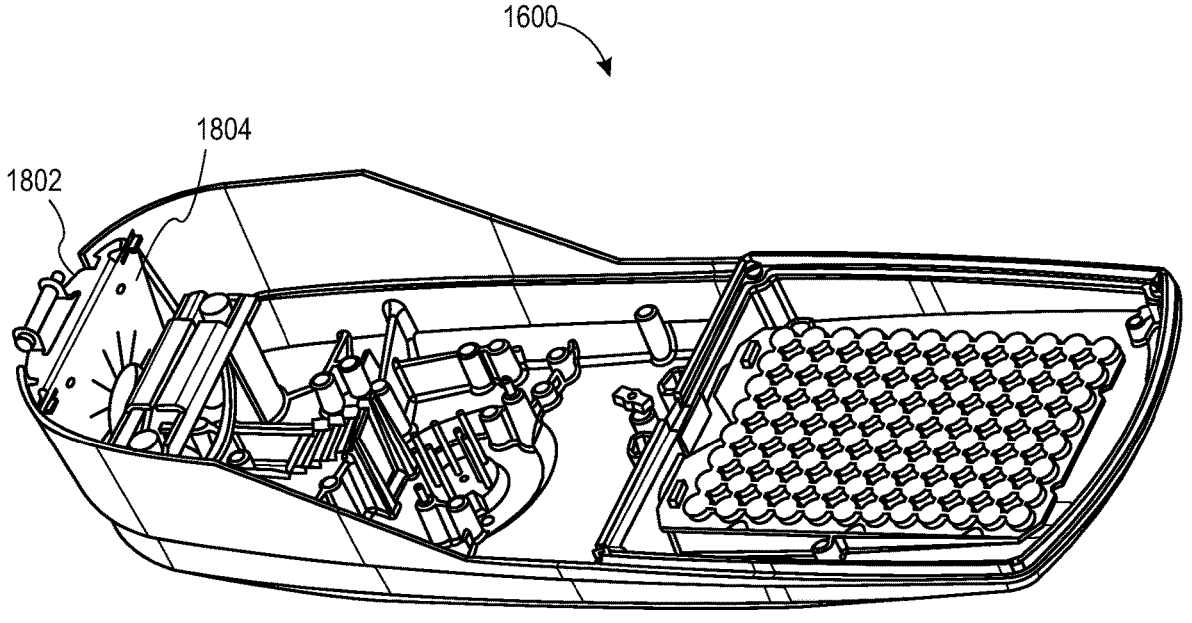
FIG. 18 is a bottom perspective view of an alternative luminaire assembly with the hinged cover removed according to some embodiments.

FIG. 18 is a bottom perspective view of the alternative luminaire assembly 1600 with the hinged cover 1602 removed according to some embodiments. Removal of the hinged cover 1602 reveals a bottom view of a hinge bracket 1802 and a moisture intrusion guard 1804, in accordance with some embodiments of the invention. The hinge bracket 1802 is shown and described in more detail in FIGS. 19-21 and 24-26. The moisture intrusion guard 1804 is shown and described in more detail in FIGS. 22 and 23.

Figure 19:
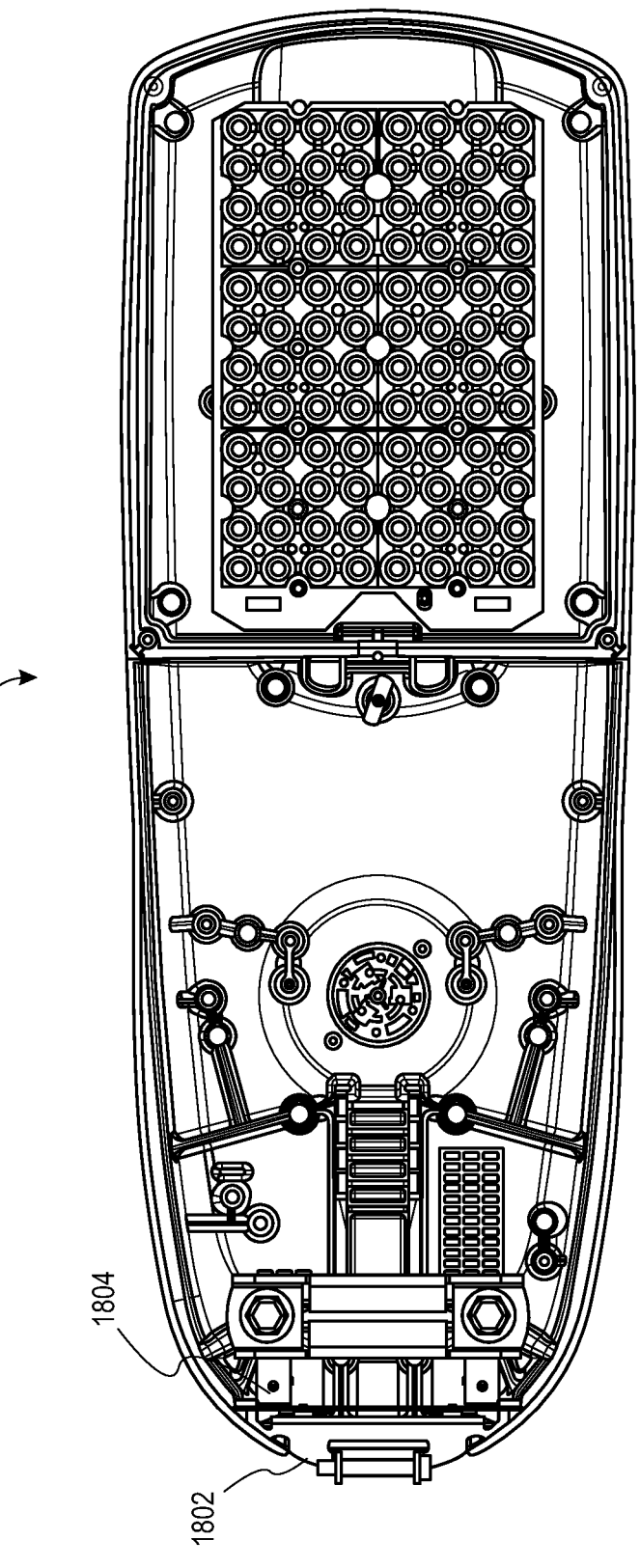
FIG. 19 is bottom plan view of an alternative luminaire assembly with the hinged cover removed according to some embodiments.

FIG. 19 is bottom plan view of the alternative luminaire assembly 1600 with the hinged cover 1602 removed according to some embodiments.

Figure 20:
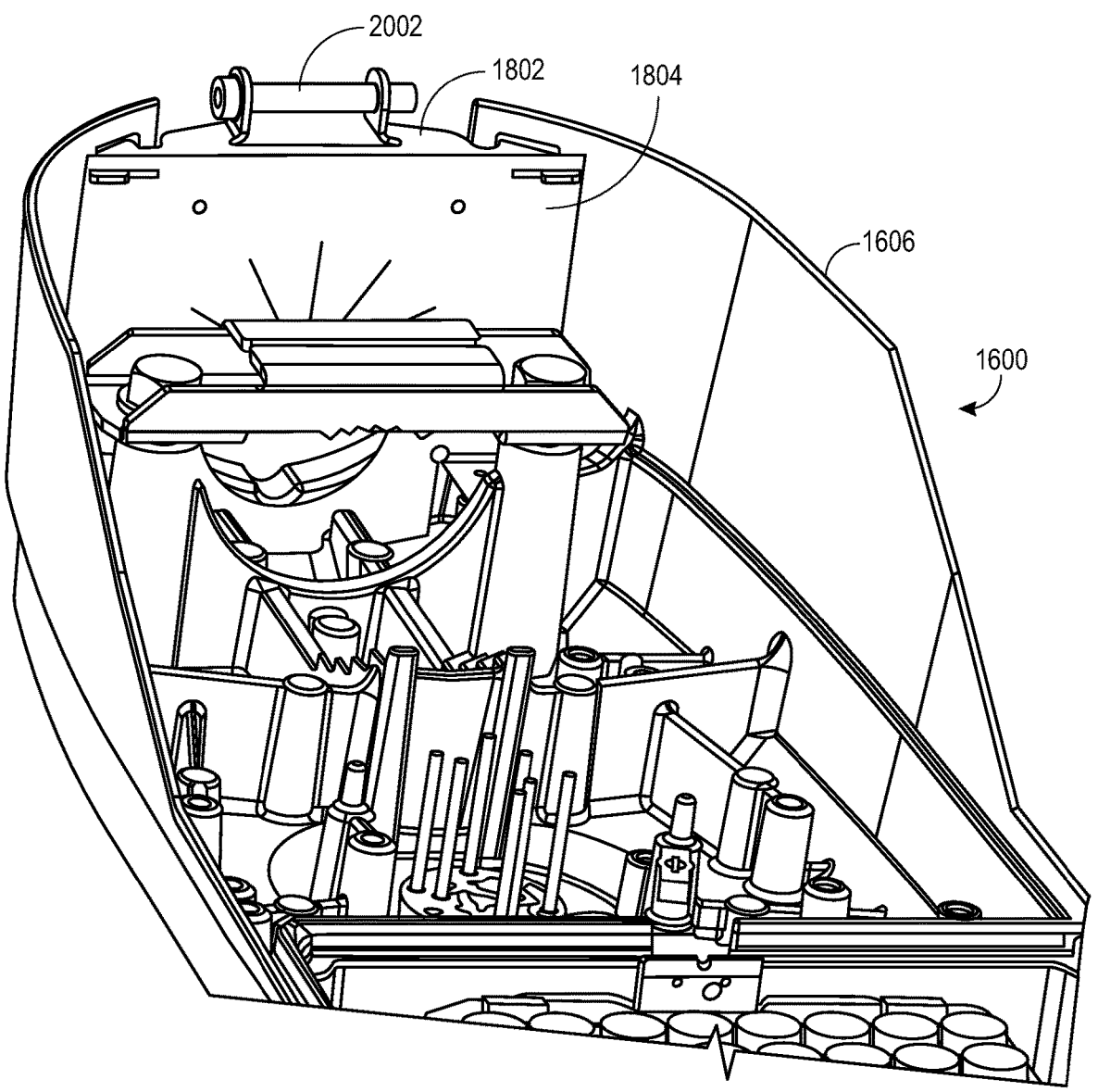
FIG. 20 is an expanded bottom perspective view of an alternative luminaire assembly with the hinged cover removed according to some embodiments.

FIG. 20 is an expanded bottom perspective view of the alternative luminaire assembly 1600 with the hinged cover 1602 removed according to some embodiments. The male portion 2002 of the hinge arrangement 1604 is shown inserted through the hinge bracket 1802, where the hinge bracket 1802 is itself attached to the housing 1606 and the moisture intrusion guard 1804 is connected to the hinge bracket 1802 and the housing 1606. In some embodiments of the invention, the male portion 2002 is a fastener, pin, bolt or screw.

Figure 21:
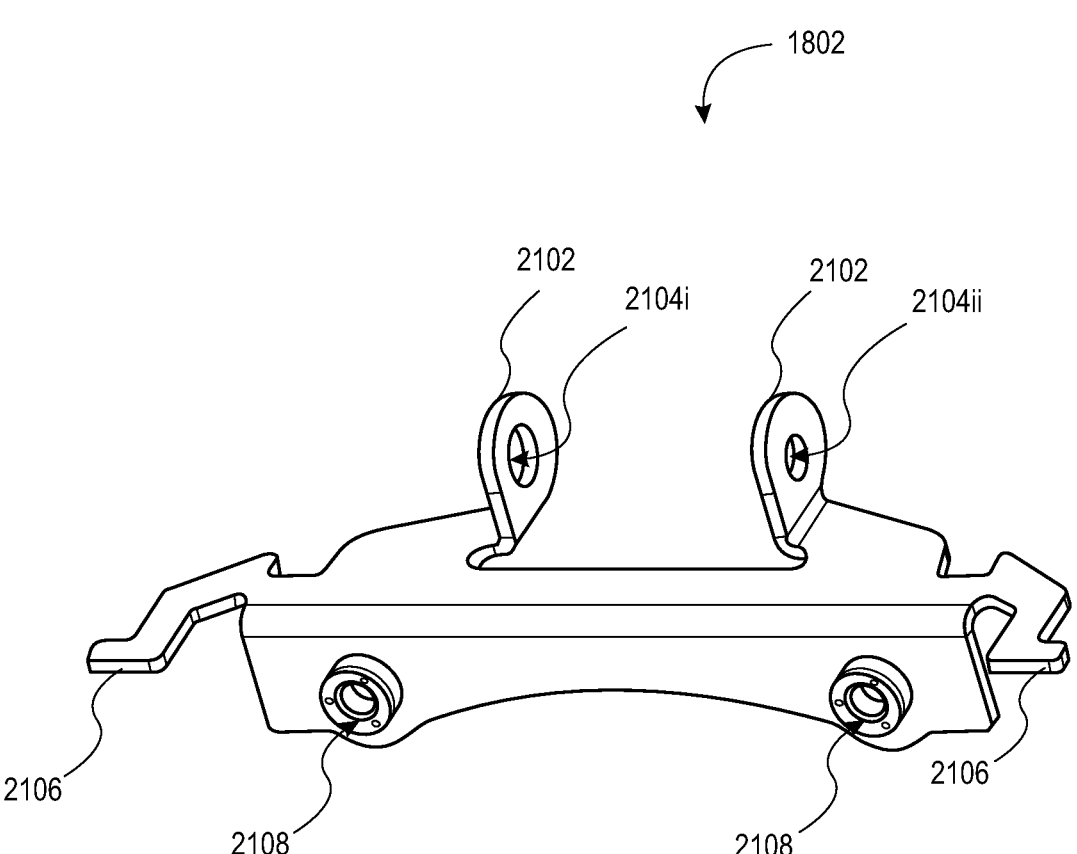
FIG. 21 is a bottom perspective view of a hinge bracket of an alternative luminaire assembly according to some embodiments.

FIG. 21 is a perspective view of the hinge bracket 1802 of the alternative luminaire assembly 1600 according to some embodiments. In an embodiment of the invention, the male portion 2002 is inserted through holding rings 2102 with apertures 2104*i*, 2104*ii* disposed therein. Optionally, first aperture 2104*i* does not have the same shape and/or size as second aperture 2104*ii*. Protrusions 2106 of the hinge bracket 1802 are used to attach the moisture intrusion guard 1804 to the hinge bracket 1802, wherein the protrusions 2106 extend through slots 2202 on the moisture intrusion guard 1804, as will be shown and described in more detail with respect to FIGS. 22, 23 and 26. In some embodiments, the lateral distance between the outer tips of the protrusions is greater than the lateral distance between the slots 2202 on the moisture intrusion guard 1804. In such embodiments, the moisture intrusion guard 1804 is stretched to fit around the protrusions 2106 during assembly. Once clear of the outer tips of the protrusions 2106, the moisture intrusion guard and associated slots 2106 can return to a relaxed or non-stretched state. The elastic nature of the intrusion guard 1804 assists in stretching for installation of the guard 1804.

In some embodiments, slanted regions of the protrusions 2016 engage with alignment slots in the housing of the luminaire, as illustrated in FIG. 20. As shown in FIG. 20, the recesses of the protrusions 2016 proximate the holding rings 2102 receive a portion of the luminaire housing, wherein the slanted regions of each protrusion insert into alignment apertures in the back of the luminaire housing. In some embodiments of the invention, the hinge bracket 1802 has attachment apertures 2108 disposed therein for insertion of fasteners 2402 therethrough.

Figure 22:
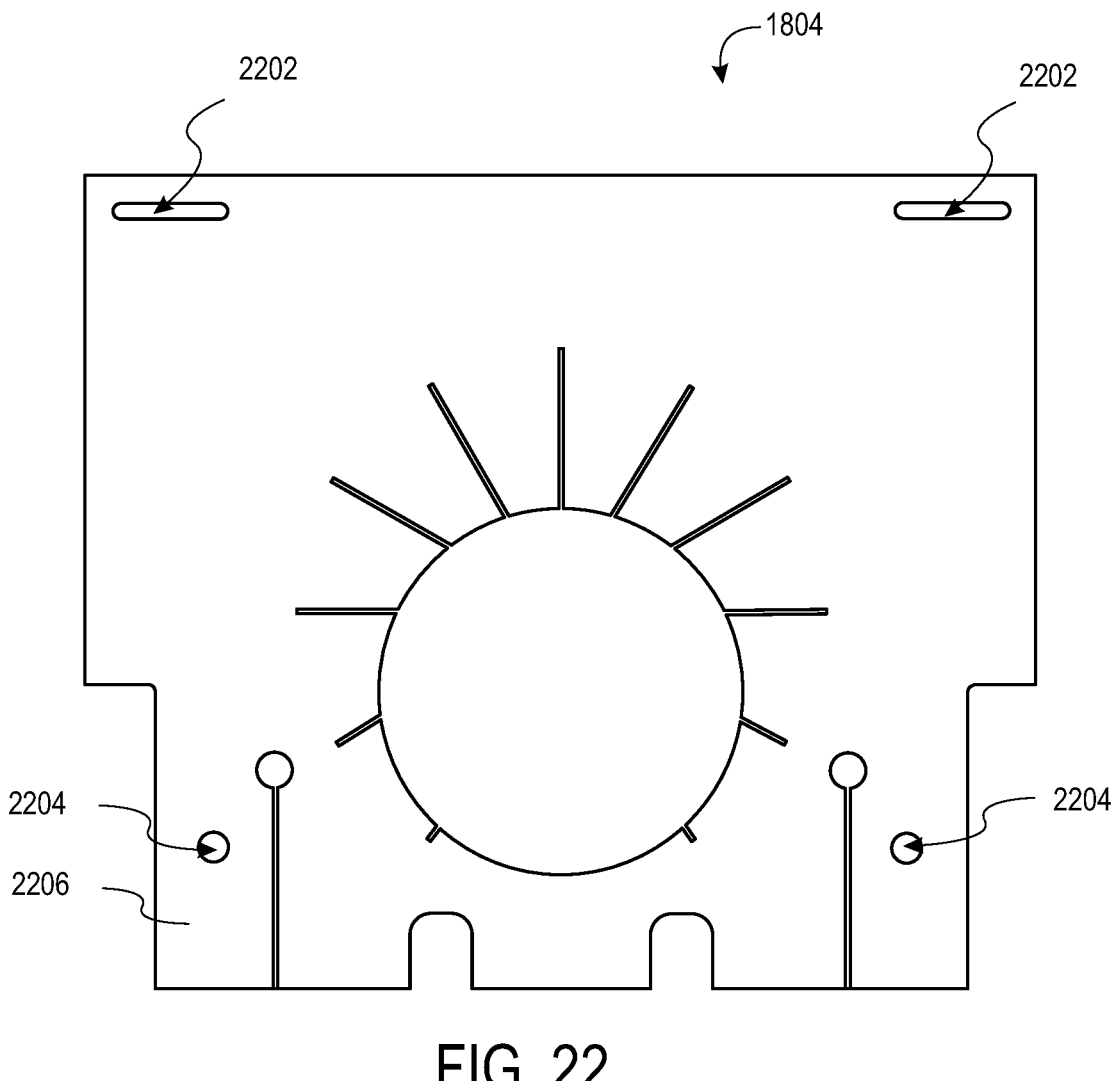
FIG. 22 is a front view of an alternative moisture intrusion guard according to some embodiments.

FIG. 22 is a front/back view of the alternative moisture intrusion guard 1804 according to some embodiments. Moisture intrusion guard 1804 is structurally and functionally similar to moisture intrusion guard 1100 with optionally slightly differently shaped fastening holes 2204, in some embodiments of the invention. As can be seen in FIG. 22, holes 2204 are optionally circular rather than ovoid (like holes 1108), although holes 2204 are also configured for receipt therethrough of a fastener, such as a screw, which secures a "lower" portion 2206, as viewed from this orientation, of the guard 1804 to the housing 1806.

Figure 23:
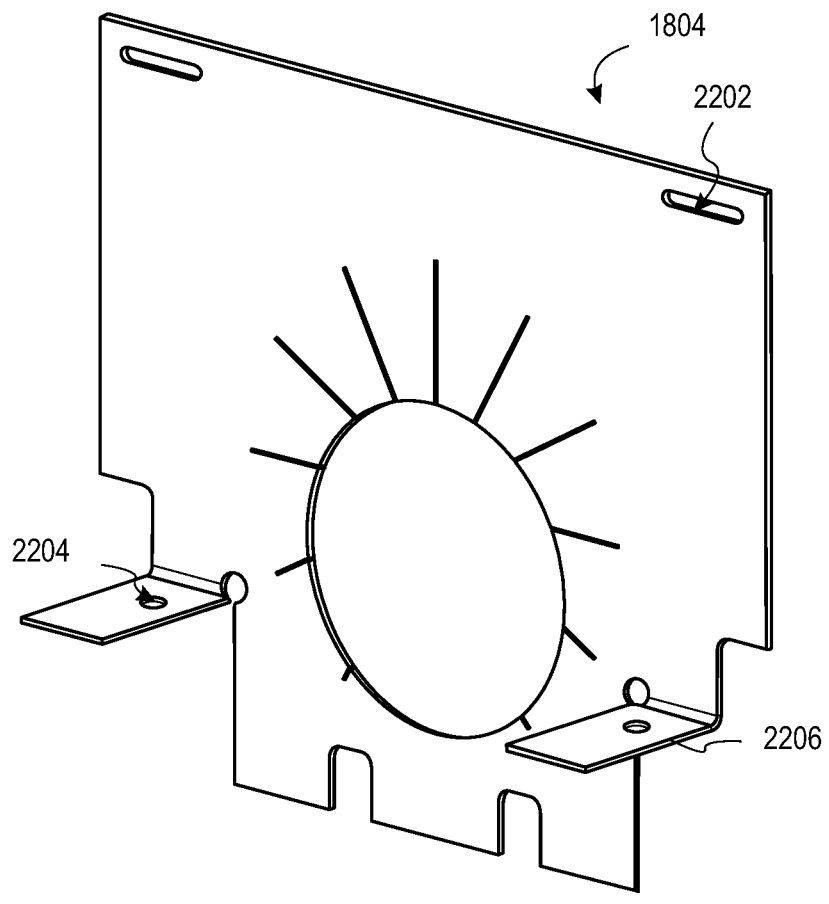
FIG. 23 is a front perspective view of the alternative moisture intrusion guard of FIG. 22 according to some embodiments.

FIG. 23 is a front perspective view of the alternative moisture intrusion guard 1804 of FIG. 22 according to some embodiments. Moisture intrusion guard 1804 is effectively similar to moisture intrusion guard 1100, therefore in the interest of brevity, the description of guard 1804 will not be repeated.

Figure 24:
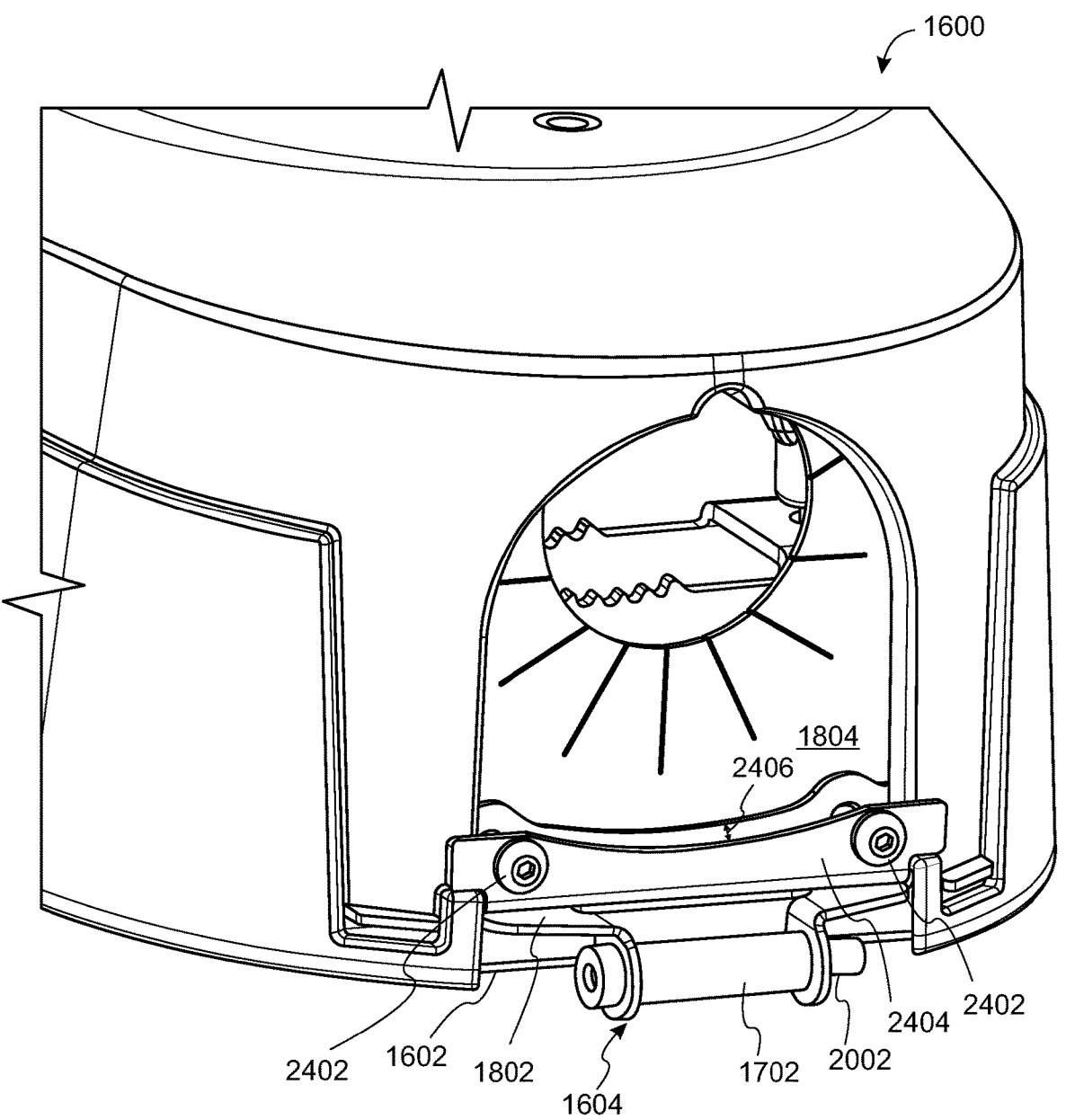
FIG. 24 is a rear perspective view of an alternative luminaire assembly according to some embodiments.

FIG. 24 is a rear perspective view of the alternative luminaire assembly 1600, according to some embodiments. From this view, the hinge arrangement 1604 is seen wherein the male portion 2002 of the hinge is inserted through the hinge bracket 1802 and the female portion 1702 on the cover 1602 is placed around the male portion 2002 and between the holding rings 2102 such that the female portion 1702 is rotatable around the male portion 2002, effectuating hinged movement of the cover 1602 from a closed configuration (shown in FIG. 16) to an open configuration. It can also be seen in FIG. 24 that the hinge bracket 1802 in combination with an exterior flange 2404 which is attached to the hinge bracket 1802 by at least one fastener 2402. A gap 2406 is created between the hinge bracket 1802 and the exterior flange 2404 sized for placement of the housing 1606 therein, such that movement of the housing is restricted by being trapped in the gap 2406.

Figure 25:
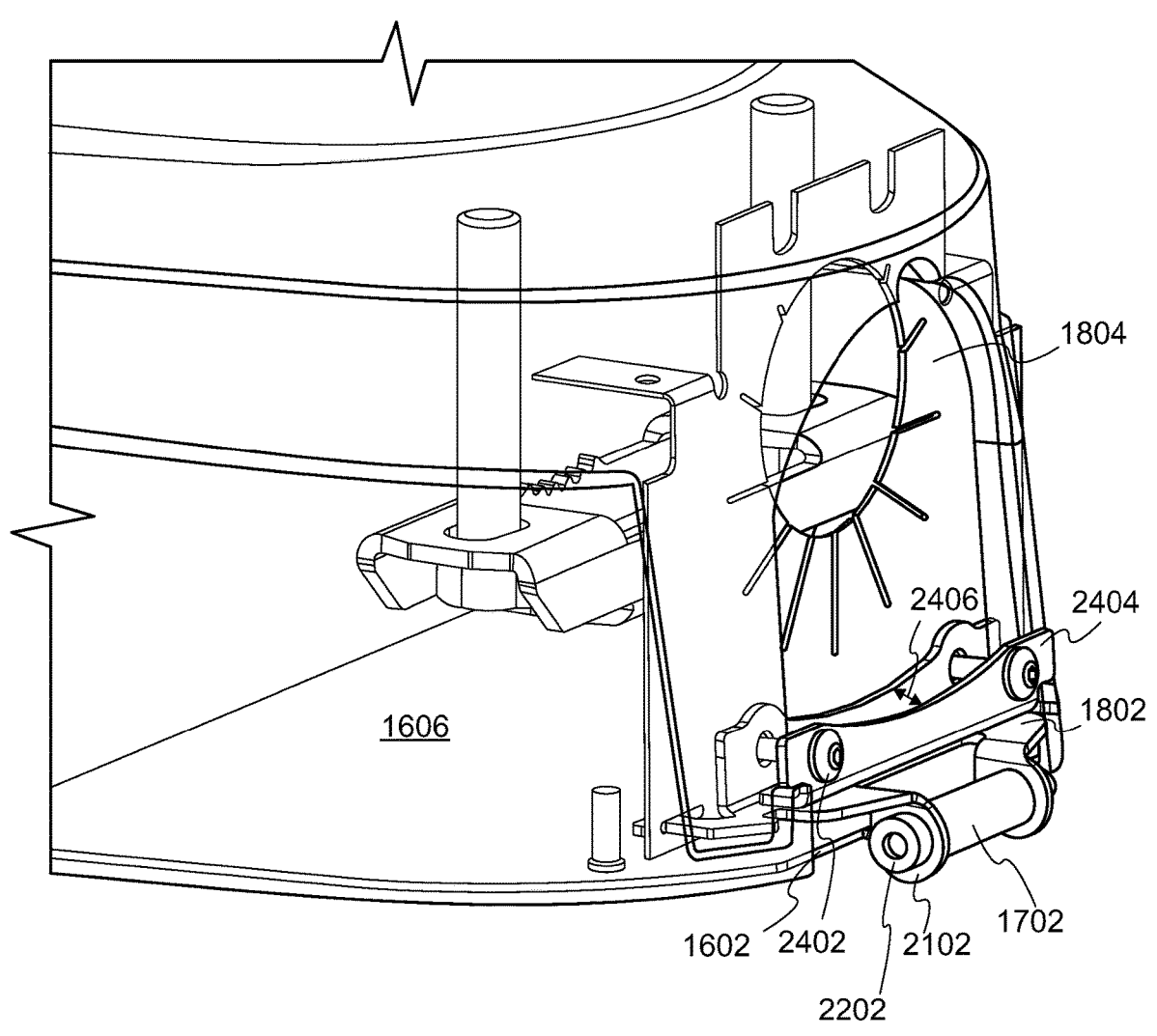
FIG. 25 is a side perspective view of the rear of an alternative luminaire assembly according to some embodiments; and, FIG. 26 is a side perspective view of the rear of an alternative luminaire assembly with the housing removed according to some embodiments.

FIG. 25 is a side perspective view of the rear of the alternative luminaire assembly 1600, according to some embodiments. This view shows the gap 2406 more clearly and the deposition of the housing 1606 therein.

Figure 26:
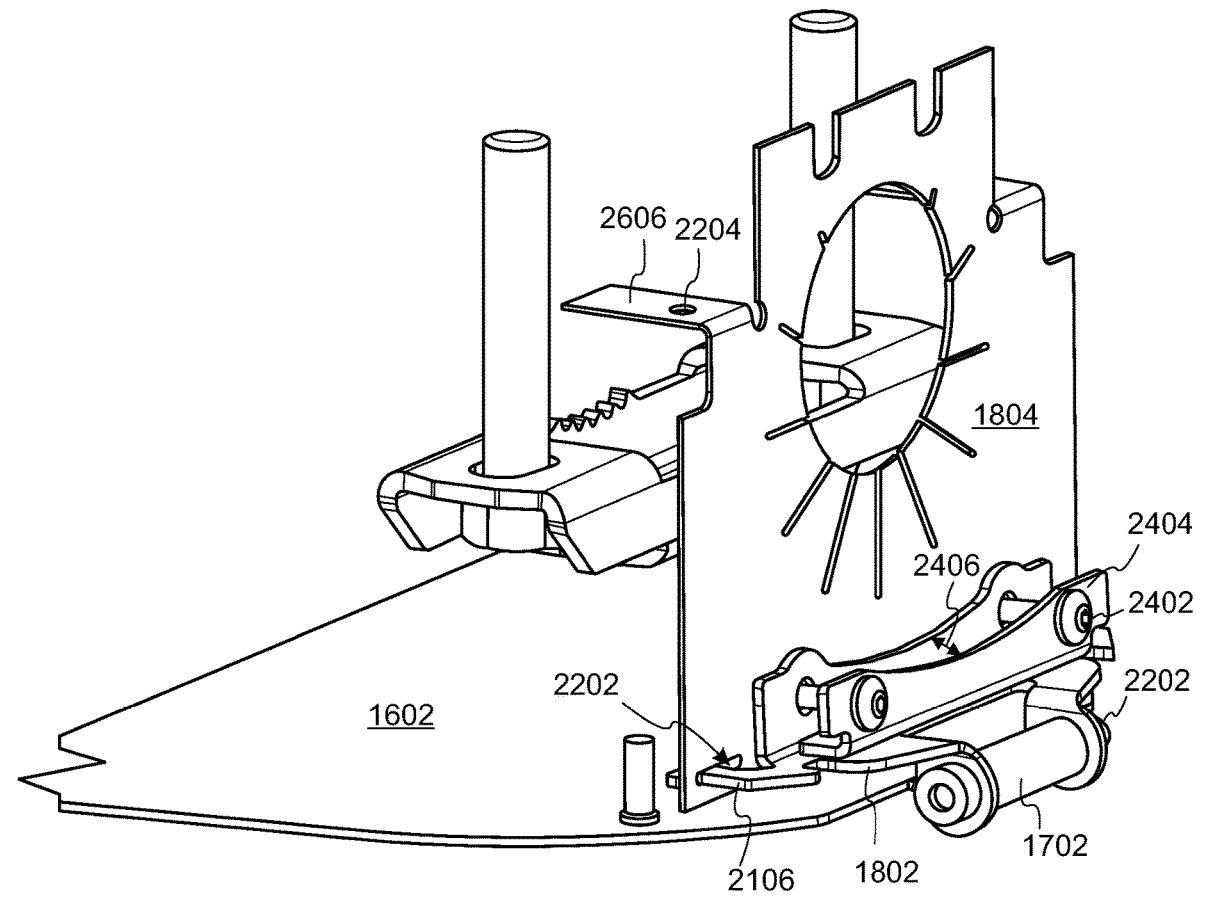

FIG. 26 is a side perspective view of the rear of the alternative luminaire assembly 1600 with the housing removed according to some embodiments. In an embodiment of the invention, protrusion 2106 is shown inserted into the slot 2202, thereby securing the guard 1804 to the hinge bracket 1802. In some embodiments, the hinge bracket 1802 is not a separate component and is integral with the housing 1606 of the luminaire. The hinge bracket, for example, can be part of the housing 1606 casting, thereby becoming monolithic or continuous with the remainder of the housing. In such embodiments, the exterior flange 2404 and associated fasteners 2402 may be obviated. Alternatively, the exterior flange 2404 is not a separate component and is integral with the housing 1606 of the luminaire. In some embodiments, the exterior flange 2404 is part of the housing 1606 casting. Additionally, in some embodiments, both the hinge bracket 1802 and the exterior flange 2404 can be integral with the housing 1606 of the luminaire, including being part of the housing 1606 casting.

In some embodiments, one or more of the protrusions securing the intrusion guard are associated with or originate in the housing. The protrusions, for example, can be extend from interior wall(s) of the housing or can be associated with one or more structures within the housing. In such embodiments, the protrusions are not associated with the cover or the retention assembly of the cover. In some embodiments, protrusions securing the intrusion guard can be originate from the housing and the cover retention assembly.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

It is expected that during the life of a patent maturing from this application many relevant luminaires will be developed and the scope of the term luminaire is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The term "plurality" means "two or more".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A luminaire comprising:
a housing;
a cover coupled to the housing, wherein the cover and the housing combine to form an enclosure and define a mounting opening thereinto at a rear of the luminaire for receiving a tenon;
a pliable moisture intrusion guard sheet covering the mounting opening and defining an orifice for receiving the tenon, the orifice being substantially aligned with the mounting opening, wherein the pliable moisture intrusion guard sheet includes at least one slot;
a guard retention structure including at least one protrusion passing through the at least one slot, thereby securing the pliable moisture intrusion guard sheet in the enclosure and forming a seal about the mounting opening, wherein the at least one protrusion extends from the cover.

2. The luminaire of claim 1, wherein the guard retention structure comprises a plurality of protrusions for passing through multiple slots of the pliable moisture intrusion guard sheet.

3. The luminaire of claim 1 further comprising a hinge bracket for coupling with the cover.

4. The luminaire of claim 3, wherein the cover rotates via the hinge bracket between open and closed positions.

5. The luminaire of claim 1, wherein the at least one protrusion comprises a stepped architecture for passing through the at least one slot while also passing through an aperture in a base of the housing.

6. The luminaire of claim 1, wherein the orifice of the pliable moisture intrusion guard sheet is configured to receive a tenon with a cross-section of 1.66 inches to 2.375 inches.

7. The luminaire of claim 1, wherein the pliable moisture intrusion guard sheet is provided with at least one hole disposed on a lower portion of the moisture intrusion guard sheet.

8. The luminaire of claim 1, wherein a lower portion of the pliable moisture intrusion guard sheet includes at least one cutout.

9. The luminaire of claim 1, wherein the pliable moisture intrusion guard sheet is constructed of an elastic or elasto-meric material.

10. A method of installing a moisture intrusion guard sheet in a luminaire, comprising:

positioning the moisture intrusion guard sheet within a housing of the luminaire to cover a mounting opening at a rear of the luminaire for receiving a tenon;

substantially aligning the orifice in the moisture intrusion guard sheet for receiving the tenon with the mounting opening;

passing at least one protrusion extending from the cover through least one slot disposed within the moisture intrusion guard sheet;

rotating a cover and the at least one protrusion with respect to a cover retention assembly thereby closing an interior cavity of the luminaire.

11. The method according to claim 10, further comprising inserting a fastener through at least one hole on a lower portion of the moisture intrusion guard sheet and into a threaded or unthreaded hole disposed in the housing.

12. The method according to claim 10, further comprising forming a seal between the moisture intrusion guard sheet and the housing.

\* \* \* \* \*